United States Patent [19]

Nakamura et al.

[11] Patent Number: 5,066,577
[45] Date of Patent: Nov. 19, 1991

[54] SILVER HALIDE COLOR PHOTOGRAPHIC MATERIAL

[75] Inventors: Koki Nakamura; Takayuki Ito; Masaaki Tsukase; Toshiki Taguchi, all of Kanagawa, Japan

[73] Assignee: Fuji Photo Film Co., Ltd., Kanagawa, Japan

[21] Appl. No.: 513,736

[22] Filed: Apr. 24, 1990

[30] Foreign Application Priority Data

Apr. 25, 1989 [JP] Japan .................................. 1-105424

[51] Int. Cl.$^5$ .......................... G03C 5/54; G03C 7/26
[52] U.S. Cl. .................................. 430/562; 430/222; 430/223
[58] Field of Search ............... 430/562, 222, 223, 225, 430/226

[56] References Cited

U.S. PATENT DOCUMENTS

| 3,942,987 | 3/1976 | Landholm et al. | 430/562 |
| 4,268,625 | 5/1981 | Fujita et al. | 430/562 |
| 4,524,122 | 6/1985 | Weber et al. | 430/562 |
| 4,783,396 | 11/1988 | Nakamura et al. | 430/562 |

Primary Examiner—Richard L. Schilling
Attorney, Agent, or Firm—Sughrue, Mion, Zinn, Macpeak & Seas

[57] ABSTRACT

A silver halide color photographic material comprising a support having thereon at least one silver halide emulsion layer, wherein the silver halide color photographic material contains an image forming compound represented by the following general formula (I):

$$(Dye-X)_q-Y \quad (I)$$

wherein Dye represents a cyan dye group represented by the general formula (II) described below or a precursor thereof; X represents a chemical bond or a linking group; Y represents a group having a property of releasing Dye in correspondence or counter-correspondence to development of a light-sensitive silver salt having a latent image distributed imagewise and making a difference in diffusibility between the dye thus-released and the compound represented by (Dye—X)$_q$—Y; Dye and X are connected with each other by C or E in the general formula (II); and q represents an integer of 1 or 2, and when q is 2, the two groups (Dye—X) may be the same or different:

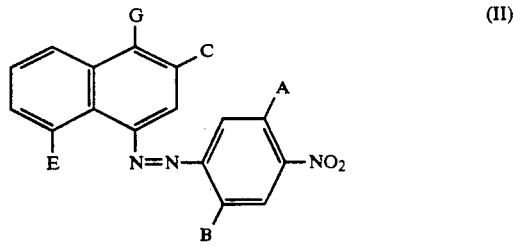

wherein A represents a halogen atom, —OR$^1$ or —SR$^1$ (wherein R$^1$ represents an alkyl group, an aryl group or a heterocyclic group); B represents an electron withdrawing group having a Hammett's σp value of not less than 0.3; C represents a chemical bond, a hydrogen atom, an alkyl group, a cycloalkyl group, an aryl group, a halogen atom, —OR$^4$, —CONR$^4$R$^5$, —SO$_2$NR$^4$R$^5$, —N(R$^3$)—COR$_4$ or —N(R$^3$)—SO$_2$R$_4$ (wherein R$^3$, R$^4$ and R$^5$ each represents a hydrogen atom or a group selected from those defined for R$^1$, or R$^4$ and R$^5$ may combine with each other to form a 5-membered or 6-membered ring); E represents a chemical bond, a hydrogen atom, an alkyl group, a halogen atom, —OR$^4$, —CONR$^4$R$^5$, —SO$_2$NR$^4$R$^5$, —N(R$^5$)—COR$^4$ or —N(R$^5$)—SO$_2$R$^4$ (wherein R$^4$ and R$^5$ have the same meaning as defined above); and G represents a hydroxy group or a salt thereof, or a group selected from those represented by the formula (T), (U) or (V):

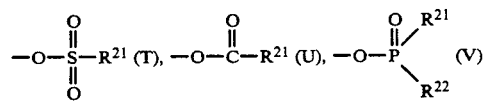

wherein R$^{21}$ and R$^{22}$, which may be the same or different, each represents an alkyl group, a cycloalkyl group, an alkenyl group, an aralkyl group, an aryl group, a heterocyclic group, an alkylthio group, an arylthio group, an alkoxy group, an aryloxy group or an amino group, or R$^{21}$ and R$^{22}$ may combine with each other to form a 5-membered or 6-membered ring.

5 Claims, No Drawings

SILVER HALIDE COLOR PHOTOGRAPHIC MATERIAL

FIELD OF THE INVENTION

The present invention relates to a color photographic light-sensitive material which contains a novel cyan azo dye image forming compound.

BACKGROUND OF THE INVENTION

In the field of silver halide photographic materials, methods for forming images by a diffusion transfer process are widely employed. The usefulness of the methods is also commonly recognized in view of instant formation of image.

In methods for forming color images by a diffusion transfer process, a so-called subtractive process in which color images are formed by a combination of yellow, magenta and cyan dye providing compounds is generally adopted. Among such methods, a color diffusion transfer photographic process has heretofore been well known using an azo dye image forming compound which provides an azo dye having a diffusibility different from that of the dye image forming compound as a result of development under a basic condition.

Examples of such image forming compounds releasing a cyan dye include those described in U.S. Pat. Nos. 3,942,987, 4,273,708 and 4,268,625.

However, the compounds as described in these references have been found to be disadvantageous because they have a nitro group in the para-position of the azo group which is subject to reduction during development that will cause discoloration. It has been also found that azo dyes containing a nitro group are generally subject to reduction by light, and thus they provide poor fastness of image to light.

In JP-A-53-66227 (the term "JP-A" as used herein means an "unexamined published Japanese patent application"), cyan azo dye forming compounds having a trifluoromethanesulfonyl group in the para-position of the azo group are described. However, such compounds are disadvantageous in that the incorporation of fluorine is troublesome from the standpoint of synthesis of the compound and environmental pollution. Moreover, further improvements on clearness of hue and transferability of dye released therefrom have been desired with these compounds.

Furthermore, cyan dyes having an acylamino group in the 2-position of a naphthol group are described in JP-A-63-40152. While fastness of the dye is improved, solubility of the dye providing compound per se is sometime severely deteriorated by the introduction of the acylamino group into the 2-position of the naphthol.

In embodiments using the pre-formed dyes described above, there is an advantage that dyes which are excellent in hue can be utilized. In order to enjoy this advantage, the dyes are further requested to possess other many characteristics. Such requirements make difficult the development of dyes for diffusion transfer process. Examples of the desirable characteristics include (1) hue preferred in view of color reproduction, (2) dissociation property in the form of a low pKa necessary to be mordanted, (3) sufficiently high transferability to achieve a satisfactorily high maximum image density and to reduce the image forming time, (4) stability of hue and color image under mordanted condition against light, humidity, pH or temperature, and (5) superior aptitude for use as an image forming compound in a silver halide photographic material, such as solubility, synthesis aptitude or stability of a dye providing compound.

Although various compounds have been proposed as described in know references mentioned above as image providing compounds, particularly cyan dye providing compounds, only few of them satisfies the above described requirements. Further, in many cases, the desired hue of the dye varies, depending on the use of the photographic material or on the presence of other dyes employed in combination. Therefore, development of a novel coloring material which satisfies those requirements has been desired.

The inventors have been made investigations on naphthol azo dyes as cyan image forming dyes. As a result, it has been found that naphthol azo type cyan dye providing image forming compounds have the following two severe problems. The first problem is to achieve a coexistence of hue preferred in color reproduction with fastness of dye. More specifically, although a naphthol azo dye having a nitro group in the 4-position to the azo group has a good level of hue, it has insufficient fastness. A dye having no nitro group exhibits a good level of fastness, but a long wavelength range absorption is further requested, while the long wavelength range absorption has been realized to some extent as described in JP-A-63-40152. The second problem is to achieve a coexistence of the transferability of dye with a solubility of dye providing compound. More specifically, since a dye portion is designed to be hydrophilic in order to improve transferability, the solubility of the dye providing compound is generally contradictory to the transferability. Therefore, it is difficult to provide a coexistence between the transferability of dye and the solubility of image forming compound.

SUMMARY OF THE INVENTION

It is, therefore, an object of the present invention to provide a cyan dye providing compound excellent in dye fastness suitable for use in a silver halide photographic material which forms a color image by a diffusion transfer process.

Another object of the present invention is to provide a cyan dye providing compound having excellent hue suitable for use in a silver halide photographic material which forms a color image by a diffusion transfer process.

A still another object of the present invention is to provide a cyan dye providing compound having an improved solubility.

A further object of the present invention is to provide a cyan dye providing compound which provides a cyan dye having good transferability.

A still further object of the present invention is to provide a silver halide photographic material containing a dye providing compound which has an improved solubility and provides a dye having excellent hue, fastness and transferability.

Other objects of the present invention will become apparent from the following detailed description and examples.

To achieve the above and other objects, the present invention provides a cyan dye providing image forming compound represented by the following general formula (I):

$$(Dye-x)_q-Y \quad (I)$$

wherein Dye represents a cyan dye group represented by the general formula (II) described below or a precursor thereof; X represents a chemical bond or a linking group; Y represents a group having a property of releasing Dye in correspondence or counter-correspondence to development of a light-sensitive silver salt having a latent image distributed imagewise and making a difference in diffusibility between the dye thus-released and the compound represented by (Dye—X)$_q$Y; Dye and X are connected with each other by C or E in the general formula (II); and q represents an integer of 1 or 2, and when q is 2, the two groups (Dye—X) may be the same or different:

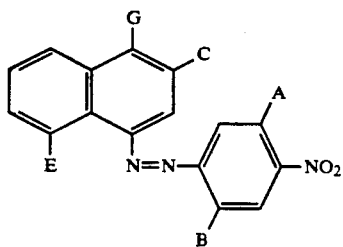

(II)

wherein A represents a halogen atom, —OR$^1$ or —SR$^1$ (wherein R$^1$ represents an alkyl group, an aryl group or a heterocyclic group); B represents an electron withdrawing group having a Hammett's op value of not less than 0.3; C represents a chemical bond, a hydrogen atom, an alkyl group, a cycloalkyl group, an aryl group, a halogen atom, —OR$^4$, —CONR$^4$R$^5$, —SO$_2$NR$^4$R$^5$, —N(R$^3$)—COR$_4$ or —N(R$^3$)—SO$_2$R$_4$ (wherein R$^3$, R$^4$ and R$^5$ each represents a hydrogen atom or a group selected from those defined for R$^1$, R$^4$ and R$^5$ may combine with each other to form a 5-membered or 6-membered ring); E represents a chemical bond, a hydrogen atom, an alkyl group, a halogen atom, —OR$^4$, —CONR$^4$R$^5$, —SO$_2$NR$^4$R$^5$, —N(R$^5$)—COR$^4$ or —N(R$^5$)—SO$_2$R$^4$ (wherein R$^4$ and R$^5$ have the same meaning as defined above); and G represents a hydroxy group or a salt thereof, or a group selected from those represented by the formula (T), (U) or (V):

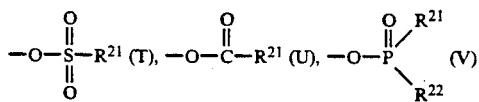

wherein R$^{21}$ and R$^{22}$, which may be the same or different, each represents an alkyl group, a cycloalkyl group, an alkenyl group, an aralkyl group, an aryl group, a heterocyclic group, an alkylthio group, an arylthio group, an alkoxy group, an aryloxy group or an amino group, or R< and R22 may combine with each other to form a 5-membered or 6-membered ring.

Thus, as a result of intensive investigations for solving the above described various problems on cyan dye providing compounds, it has been found that the above described problems on known cyan dye providing compounds can be eliminated by using a class of cyan dyes obtained, for example, by converting aniline derivatives having a nitro group in the 4-position and specific substituents in the 2- and 5-positions to diazonium salts thereof by an appropriate method, and reacting the diazonium salts with 1-naphthol derivatives, and the above described objects of the present invention are achieved.

DETAILED DESCRIPTION OF THE INVENTION

The structural feature of the dye portion (represented by the general formula (II)) of the image forming compound according to the present invention is that the dye moiety has a nitro group in the 4-position of the azo group and the 5-position (an adjacent position to the nitro group) thereof is substituted with an atom having a non-covalent electron pair.

With naphthol azo dyes having a nitro group in the 4-position of the azo group, there is generally a tendency that hue becomes sharp and light fastness is improved by introducing an electron withdrawing group in the 2-position of the azo group. However, dyes of this type exhibit inferior fastness in a wet and reductive atmosphere and have a large tendency to inhibit development of silver halide. It is believed that the reason for this is that the dyes possess a high electron withdrawing property.

According to the image forming compound of the present invention, in which an atom having a non-covalent electron pair is connected to the 5-position to the azo group, the above described difficulty can be remarkably reduced without adversely affecting its hue.

Further, with azo dyes having a nitro group in the 4-position of the azo group and an electron withdrawing substituent, for example, a methanesulfonyl group or a cyano group in the 2-position of the azo group, it is often difficult to achieve a coexistence of the solubility of image forming compound with the transfer speed of a released dye. On the contrary, with the compound according to the present invention, the coexistence of these properties can be achieved which is an unexpected result.

The cyan dye providing image forming compound according to the present invention possesses a novel dye portion as an image forming compound utilizing an oxidation-reduction reaction, and it is not disclosed in the above described known references. While the reason why the objects of the present invention can be achieved is not certain, it is believed that a steric effect newly occurs by introducing the substituent into the adjacent position to the nitro group.

Now, the image forming compound represented by the general formula (I) according to the present invention will be explained in detail below The linking group represented by X includes an —NR$^6$- group (in which R$^6$ represents a hydrogen atom, an unsubstituted alkyl group, a substituted alkyl group), an —SO$_2$— group, a —CO— group, an unsubstituted alkylene group, a substituted alkylene group, an unsubstituted phenylene group, a substituted phenylene group, an unsubstituted naphthylene group, a substituted naphthylene group, an —O— group, an —SO— group, or a group formed by combining two or more these groups. Preferred linking groups are those represented by —NR$^6$—SO$_2$—, —NR$^6$—CO— or —R$^7$—(L-)$_k$—(R$^8$)$_l$— in which R$^7$ and R$^8$ each represent an unsubstituted alkylene group, a substituted alkylene group, an unsubstituted phenylene group, a substituted phenylene group, an unsubstituted naphthylene group, or a substituted naphthylene group; L represents —O—, —CO—, —SO—, —SO$_2$—, —SO$_2$NH—, —NHSO$_2$—, —CONH—, or —NHCO—; k represents 0 or 1; and l represents 1 when k is 1, or 1 or 0 when k is 0.

Other preferred examples of linking groups include a group formed by combining —NR$^6$—SO$_2$— or —NR$^6$—CO— with —R$^7$—(L)$_k$—(R$^8$)$_l$—.

Preferred examples of the group represented by R$^6$ include a hydrogen atom, a substituted or unsubstituted lower alkyl group having from 1 to 4 carbon atoms (examples of substituent include, a hydroxy group, an alkoxy group, or a cyano group). Particularly preferred of these R$^6$ groups is a hydrogen atom.

Preferred examples of the group represented by R$^7$ or R$^8$ include a substituted or unsubstituted alkylene group having from 1 to 6 carbon atoms (examples of substituent include an alkyl group, an alkoxy group, a hydroxy group, a halogen atom, or a cyano group), a substituted or unsubstituted phenylene group (including an ortho-, meta-, or para-phenylene group, and examples of substituent include an unsubstituted alkyl group, a substituted alkyl group, an unsubstituted alkoxy group, a substituted alkoxy group, a halogen atom, a hydroxy group, a carboxyl group, an unsubstituted sulfamoyl group, a substituted sulfamoyl group, an alkylsulfonylamino group, a sulfamido group, or a disubstituted amino group), or a substituted or unsubstituted naphthylene group (examples of substituent including those defined for the phenylene group above). The group represented by R$^7$ or R$^8$ which may be substituted has the total carbon number of up to 15.

Examples of the halogen atom represented by A include fluorine, chlorine, bromine or iodine. Preferred examples of the group represented by R$^1$ in —OR$^1$ or —SR$^1$ include an alkyl group having from 1 to 9 carbon atoms (for example, methyl, ethyl, isopropyl, isobutyl, 2-methoxyethyl, 2-hydroxyethyl, 2-(2-methoxyethoxy) ethyl, or 2-acetylaminoethyl), an aryl group having from 6 to 10 carbon atoms (for example, phenyl, 3-carboxyphenyl, or 4-methoxyphenyl) or a heterocyclic group having from 1 to 9 carbon atoms (for example, furfuryl, or 5-tetrazolyl). Of the groups represented by A, —OR$^1$ is preferred.

Examples of an electron withdrawing group having a Hammett's σp value of not less than 0.3 represented by B include a cyano group, —SO$_2$R$^1$, —SO$_2$NR$^4$R$^5$, a chlorine atom, —COR$^1$, —CONR$^4$R$^5$ or a nitro group, in which R$^1$ has the same meaning as defined for R$^1$ in A; and R$^4$ and R$^5$, which may be the same or different, each represents a hydrogen atom or a group selected from those defined for R$^1$, or R$^4$ and R$^5$ may combine with each other to form a morpholine ring or a piperadine ring. Of the groups represented by B, a cyano group and —SO$_2$R$^1$ are preferred.

In the general formula (II), C represents a chemical bond, a hydrogen atom, an alkyl group (preferably having from 1 to 4 carbon atoms, for example, methyl, ethyl, 2-methoxyethyl, or hydroxymethyl), a cycloalkyl group (preferably having from 3 to 7 carbon atoms, for example, cyclopentyl, or cyclohexyl), an aryl group (preferably having from 6 to 10 carbon atoms, for example, phenyl, or 3-methanesulfonylaminophenyl), a halogen atom (for example, fluorine, chlorine, bromine, or iodine), —OR$^4$, —CONR$^4$R$^5$, —SO$_2$NR$^4$R$^5$, —N(R$^3$)—COR$^4$, or —N(R$^3$)—SO$_2$R$^4$ (wherein R$^4$ and R$^5$ each has the same meaning as R$^4$ and R$^5$ defined for B above, and R$^3$ represents a hydrogen atom or a group selected from those defined for R$^1$). Of the groups represented by C, —CONR$^4$R$^5$, —SO$_2$NR$^4$R$^5$ and —N(R$^3$)—COR$^4$ are preferred. Particularly, —N(R$^3$)—COR$^4$ is preferred.

In the case where the group which is connected to X is E, particularly preferred groups among the substituents represented by C include —CON(CH$_3$)$_2$, —CON(CH$_2$CH$_2$OCH$_3$)$_2$,

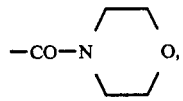

—SO$_2$NHCH$_3$, —SO$_2$NHC$_4$H$_9$(t), —SO$_2$NHC$_2$H$_5$,

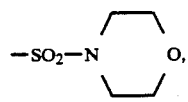

—NHCOCH$_3$, —NHCOC$_2$H$_5$, —NHCOCH$_2$OCH$_3$, or

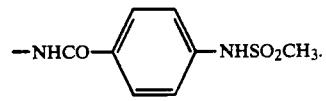

In the general formula (II), E represents a chemical bond, a hydrogen atom, a substituted or unsubstituted alkyl group (preferably having from 1 to 8 carbon atoms, for example, methyl, ethyl, or hydroxyethyl, and preferred examples of substituent include a halogen atom, a cyano group, an alkoxy group having from 1 to 5 carbon atoms, a sulfonylamino group, an acylamino group, a carbamoyl group, a sulfamoyl group, a sulfonyl group, or a disubstituted amino group having from 2 to 6 carbon atoms), a halogen atom (for example, fluorine, chlorine, bromine, or iodine), —OR$^4$, —CONR$^4$R$^5$, —SO$_2$NR$^4$R$^5$, —N(R$^3$)—COR$^4$, or —N(R$^3$)—SO$_2$R$^4$ (wherein R$^4$ and R$^5$ each has the same meaning as R$^4$ and R$^5$ defined for B above; and R$^3$ represents a hydrogen atom or an alkyl group having from 1 to 4 carbon atoms and preferably a hydrogen atom). Of the groups represented by E, —N(R$^3$)—COR$^4$ and —N(R$^3$)—SO$_2$R$^4$ are preferred.

In the case where the group which is connected to X is C, particularly preferred groups among the substituents represented by E include —NHCOCH$_3$,

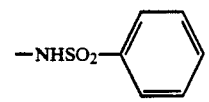

—NHSO$_2$CH$_3$, —NHSO$_2$C$_2$H$_5$,

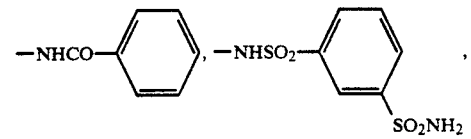

or 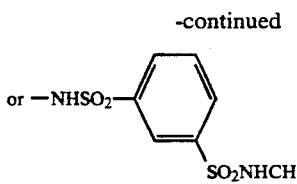

G in the general formula (II) represents a hydroxy group or a salt thereof such as an alkali metal salt (e.g., —OLi, or —OK), or a photographically inert ammonium salt (e.g., —ONH$_4$, or —ON(C$_2$H$_5$)$_4$), or a group selected from the groups represented by the general formula (T), (U) or (V):

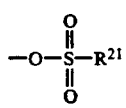 (T)

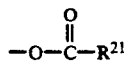 (U)

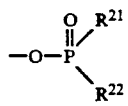 (V)

wherein R$^{21}$ and R$^{22}$, which may be the same or different, each represents an unsubstituted or a substituted alkyl group (for example, methyl, ethyl, or tert-butyl), an unsubstituted or substituted cycloalkyl group (for example, cyclopentyl, or cyclohexyl), an unsubstituted or a substituted alkenyl group (for example, allyl), an unsubstituted or a substituted aralkyl group (for example, benzyl, or phenethyl), an unsubstituted or a substituted aryl group (for example, phenyl, naphthyl, or 4-methoxyphenyl), an unsubstituted or a substituted heterocyclic group (for example, 2-furyl, or 2-pyridyl), an unsubstituted or a substituted alkylthio group (for example, methylthio, or 2-hydroxyethylthio), an unsubstituted or a substituted arylthio group (for example, phenylthio, or 4-chlorophenylthio), an unsubstituted or a substituted alkoxy group (for example, methoxy, 2-methoxyethoxy, or dodecyloxy), an unsubstituted or a substituted aryloxy group (for example, phenoxy, or 2-nitrophenoxy), or an unsubstituted or a substituted amino group (for example, amino, phenylamino, or morpholino), or R$^{21}$ and R$^{22}$ may combine with each other to form a 5-membered or 6-membered ring. The group represented by R$^{21}$ and R$^{22}$ which may be substituted has the total carbon number of up to 30.

More preferred compounds of the compounds according to the present invention are those wherein G represents a hydroxy group in the general formula (II).

Further preferred compounds according to the present invention are those represented by the following general formula (II-A):

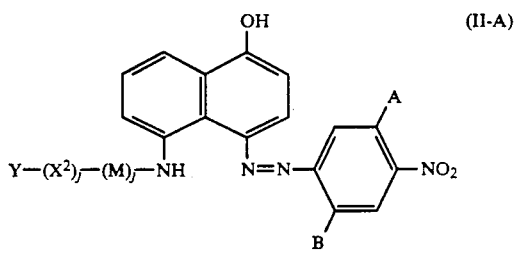 (II-A)

wherein M represents —SO$_2$— or —CO—; X$^2$ represents —R$^7$—(l)$_k$—(R$^8$)$_l$— (wherein R$^7$, L, k, l and R$^8$ each has the same meaning as defined above); i and j each represents 0 or 1; and A, B and Y each has the same meaning as defined in the general formulae (I) and (II).

The present invention will be further illustrated with reference to Y, but the present invention should not be construed as being limited thereto.

In one embodiment of the present invention, Y is selected such that the compound according to the present invention is a nondiffusible image forming compound providing a diffusible dye which undergoes self cleavage upon oxidation during development.

An example of Y which is effective for compounds of this type is an N-substituted sulfamoyl group. For example, a group represented by the following general formula (YI) is illustrated for Y:

 (YI)

wherein β represents a nonmetallic atomic group necessary for forming a benzene ring, which may optionally be fused with a carbon ring or a hetero ring to form, for example, a naphthalene ring, a quinoline ring, a 5,6,7,8-tetrahydronaphthalene ring, or a chroman ring; α represents a group of —OG$^{11}$ or —NHG$^{12}$ (wherein G$^{11}$ represents a hydrogen atom or a group which forms a hydroxyl group upon being hydrolyzed, and G$^{12}$ represents a hydrogen atom, an alkyl group containing from 1 to 22 carbon atoms or a group which renders —NHG$^{12}$ hydrolyzable); Ball represents a ballast group; and b represents an integer of 0, 1 or 2.

Specific examples of this type of Y ar described in JP-A-48-33826 and JP-A-53-50736.

Other examples of Y suited for this type of compound are those represented by the following general formula (YII):

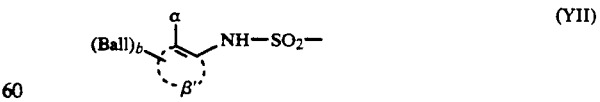 (YII)

wherein Ball, α and b each has the same meaning as defined in the general formula (YI), β' represents an atomic group necessary for forming a carbon ring such as, for example, a benzene ring which may be fused with another carbon ring or a hetero ring to form a naphthalene ring, a quinoline ring, a 5,6,7,8-tetrahydronaphthalene ring, or a chroman ring.

Specific examples of this type of Y are described in JP-A-51-113624, JP-A-56-12642, JP-A-56-16130, JP-A-56-16131, JP-A-57-4043, JP-A-57-650, and U.S. Pat. No. 4,053,312.

Further examples of Y suited for this type of compound are those represented by the following general formula (YIII):

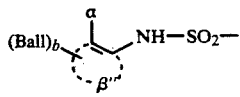
(YIII)

wherein Ball, $\alpha$ and b each has the same meaning as defined in the general formula (YI), and $\beta''$ represents an atomic group necessary for forming a hetero ring, for example, a pyrazole ring or a pyridine ring, the hetero ring being optionally fused with a carbon ring or a hetero ring.

Specific examples of this type of Y are described in JP-A-51-104343.

Still further examples of Y suited for this type of compound are those represented by the following general formula (YIV):

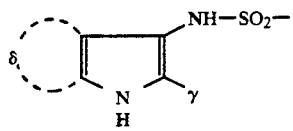
(YIV)

wherein $\gamma$ preferably represents a hydrogen atom, a substituted or unsubstituted alkyl, aryl or heterocyclic group, or $-CO-G^{21}$, $G^{21}$ represents $-OG^{22}$, $-SG^{22}$ or

(wherein $G^{22}$ represents a hydrogen atom, an alkyl group, a cycloalkyl group or an aryl group, $G^{23}$ is the same as defined for $G^{22}$ above, or $G^{23}$ represents an acyl group derived from an aliphatic or aromatic carboxylic or sulfonic acid, and $G^{24}$ represents a hydrogen atom or an unsubstituted or substituted alkyl group); and $\delta$ represents a group necessary for completing a fused benzene ring.

Specific examples of this type of Y are described in JP-A-51-104343, JP-A-53-46740, JP-A-54-130122 and JP-A-57-85055.

Still further examples of Y suited for this type of compound are those represented by the following general formula (YV):

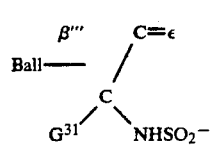
(YV)

wherein Ball has the same meaning as defined in the general formula (YI); $\epsilon$ represents an oxygen atom or $=NG32$ (wherein $G^{32}$ represents a hydroxyl group or an optionally substituted amino group; examples of $H_2N-G^{32}$ to be used for forming the $=NG^{32}$ group include hydroxylamines, hydrazines, semicarbazides, and thiosemicarbazides); $\beta'''$ represents an atomic group necessary for forming a saturated or unsaturated non-aromatic 5-membered, 6-membered or 7-membered hydrocarbon ring; and $G^{31}$ represents a hydrogen atom or a halogen atom (for example, fluorine, chlorine or bromine).

Specific examples of this type of Y are described in JP-A-53-3819 and JP-A-54-48534.

Other examples of Y of this type of compound are described, for example, in JP-B-48-32129 (the term "JPB" as used herein means an "examined Japanese patent publication"), JP-B-48-39165, JP-A-49-64436 and U.S. Pat. No. 3,443,934.

Still further examples of Y are those represented by the following general formula (YVI):

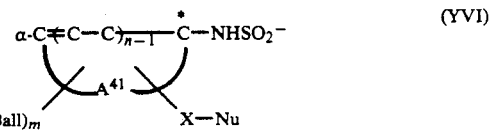
(YVI)

wherein $A^{41}$ represents an atomic group necessary for forming an aromatic ring; Ball represents an organic immobilizing group present on the aromatic ring; m represents an integer of 1 or 2 X represents a divalent organic group having from 1 to 8 carbon atoms, with the nucleophilic group (Nu) and an electrophilic center (asterisked carbon atom) formed by oxidation forming a 5-membered to 12-membered ring; Nu represents a nucleophilic group; n represents an integer of 1 or 2; and $\alpha$ has the same meaning as defined in the general formula (YI).

Specific examples of this type of Y are described in JP-A-57-20735.

As another type of compounds represented by the general formula (I), there are non-diffusible image forming compounds which release a diffusible dye in the presence of a base as a result of self cyclization or the like but which, when reacted with an oxidation product of a developing agent, substantially never release the dye.

Examples of Y effective for this type of compound are those which are represented by the following general formula (YVII):

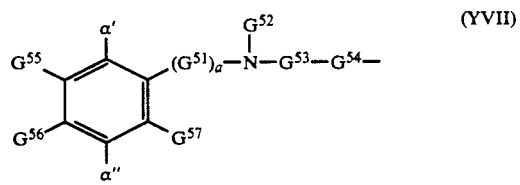
(YVII)

wherein $\alpha'$ represents an oxidizable nucleophilic group (for example, a hydroxy group, a primary or secondary amino group, a hydroxyamino group, or a sulfonamido group) or a precursor thereof; $\alpha''$ represents a dialkylamino group or any one of the groups defined for $\alpha'$; $G^{51}$ represents an alkylene group having from 1 to 3 carbon atoms; a represents 0 or 1; $G^{52}$ represents a substituted or unsubstituted alkyl group having from 1 to 40 carbon atoms or a substituted or unsubstituted aryl group having from 6 to 40 carbon atoms; $G^{53}$ represents an electrophilic group such as $-CO-$ or $-CS-$; $G^{54}$ represents an oxygen atom, a sulfur atom, a selenium atom, or a nitrogen atom, and when $G^{54}$ represents a nitrogen atom, it has bonded thereto a hydrogen atom or may be substituted with an unsubstituted or a substituted alkyl group having from 1 to 10 carbon atoms or an aromatic residue having from 6 to 20 carbon atoms; $G^{55}$, $G^{56}$ and $G^{57}$ each represents a hydrogen atom, a halogen atom, a carbonyl group, a sulfamyl group, a sulfonamido group, an alkoxy group having from 1 to 40 carbon atoms or any one of the groups defined for $G^{52}$, or $G^{55}$ and $G^{56}$ may together form a 5-membered to 7-membered ring, or $G^{56}$ may represent

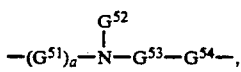

with the proviso that at least one of $G^{52}$, $G^{55}$, $G^{56}$ and $G^{57}$ represents a ballast group.

Specific examples of this type of Y are described in JP-A-51-63618.

Further examples of Y suited for this type of compound are those which are represented by the following general formulae (YVIII) and (YIX):

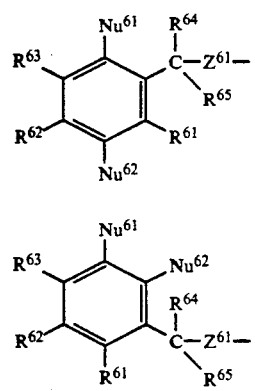

wherein $Nu^{61}$ and $Nu^{62}$, which may be the same or different, each represents a nucleophilic group or a precursor thereof; $Z^{61}$ represents a divalent atomic group which is electrically negative with respect to the carbon atom substituted by $R^{64}$ and $R^{65}$; $R^{61}$, $R^{62}$ and $R^{63}$ each represents a hydrogen atom, a halogen atom, an alkyl group, an alkoxy group or an acylamino group or, when located at adjacent positions on the ring, $R^{61}$ and $R^{62}$ may form a fused ring together with the rest of the molecule, or $R^{62}$ and $R^{63}$ may form a fused ring together with the rest of the molecule; $R^{64}$ and $R^{65}$, which may be the same or different, each represents a hydrogen atom, an unsubstituted or a substituted hydrocarbon group; with the proviso that in at least one of the substituents $R^{61}$, $R^{62}$, $R^{63}$, $R^{64}$ and $R^{65}$, a ballast group (Ball) having a large enough size so as to render the above-described compounds immobile is present.

Specific examples of this type of Y are described in JP-A-53-69033 and JP-A-54-13097.

Further examples of Y suited for this type of compound are those which are represented by the following general formula (YX):

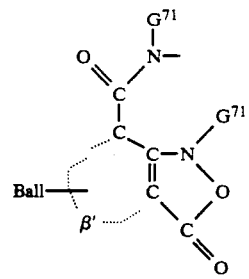

wherein Ball and $\beta'$ each has the same meaning as defined in the general formula (YII), and $G^{71}$ represents an unsubstituted or a substituted alkyl group. Specific examples of this type of Y are described in JP-A-49-111628 and JP-A-52-4819.

As still another type of compounds represented by the general formula (I), there are illustrated non-diffusible image forming compounds which themselves do not release any dye but, upon reaction with a reducing agent, release a dye. With these compounds, compounds which mediate the redox reaction (so-called electron donors) are preferably used in combination.

Examples of Y effective for this type of compound are those represented by the following general formula (YXI):

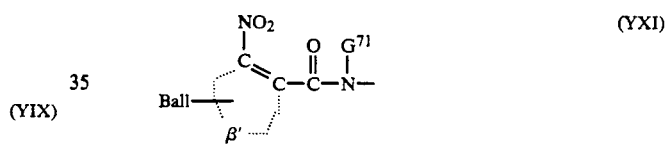

wherein Ball and $\beta'$ each has the same meaning as defined in the general formula (YII), and $G^{71}$ represents an unsubstituted or a substituted alkyl group.

Specific examples of this type of Y are described in JP-A-53-35533 and JP-A-53-11082.

Further examples of Y suited for this type of compound are those which are represented by the following general formula (YXII):

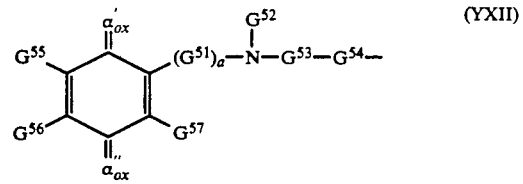

wherein $\alpha'_{ox}$ and $\alpha''_{ox}$ represent a group which produces $\alpha'$ and $\alpha''$ upon reduction, respectively; and $\alpha'$, $\alpha''$, $G^{51}$, $G^{52}$, $G^{53}$, $G^{54}$, $G^{55}$, $G^{56}$, $G^{57}$, and a each has the same meaning as defined in the general formula (YVII).

Specific examples of this type of Y are described in JP-A-53-110827, U.S. Pat. Nos. 4,356,249 and 4,358,525.

Further examples of Y suited for this type of compound are those which are represented by the following general formulae (YXIIIA) and (YXIIIB):

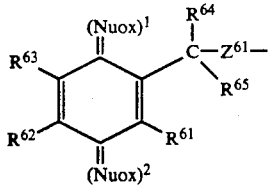

(YXIIIA)

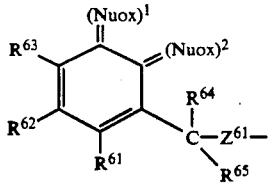

(YXIIIB)

wherein (Nuox)$^1$ and (Nuox)$^2$, which may be the same or different, each represents an oxidized nucleophilic group, and the other notations each have the same meaning as defined in the general formula (YVIII) and (YIX).

Specific examples of this type of Y are described in JP-A-54-130927 and JP-A-56-164342.

Further examples of Y suited for this type of compound are those which are represented by the following general formula (YXIV):

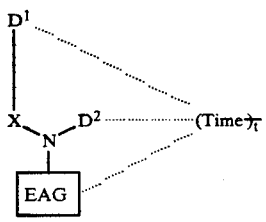

(YXIV)

wherein EAG represents a group which receives electrons from a reducing material; X represents a nitrogen atom, an oxygen atom or a sulfur atom, particularly preferably an oxygen atom; the single bond between N and X undergoes cleavage after EAG receives electrons; D$^1$ and D$^2$ each represents a chemical bond or a substituent other than a hydrogen atom, when D$^1$ or D$^2$ is bonded to —Time—$_t$, D$^1$ or D$^2$ is a chemical bond, or D$^1$ and D$^2$ may be connected with each other to form a ring; Time represents a group which releases a dye upon a reaction triggered by the cleavage of the nitrogen-X single bond; t represents an integer of 0 o 1; the solid line indicates a chemical bond; and at least one of the broken lines is bonded to the respective group.

Specific examples of this type of Y are described, for example, in U.S. Pat. No. 4,783,396 and Kokaigiho ("Technical Disclosure Bullutein") 87-6199 (Vol. 12-22).

Electron donors which may be used in combination with the compound according to the present invention are described in the patent specifications cited with reference to the compounds of the general formulae (YXI), (YXII), (YXIIIA), (YXIIIB) and (YXIV). A still further type of the compound according to the present invention is an LDA (Linked Donor Acceptor) compound. Such a compound is a nondiffusible image forming compound which undergoes a donor acceptor reaction in the presence of a base to release a diffusible dye, but does not substantially release a dye upon reaction with an oxidation product of a developing agent. Examples of Y effective for this type of compound are these represented by the following general formula (YXV):

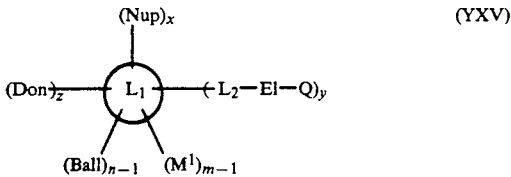

wherein n, x, y, and z each represent an integer of 1 or 2; m represents an integer of 1 or more; Don represents an electron donor or group containing a precursor portion thereof; L$_1$ represents an organic group linking Nup to —L$_2$—El—Q or Don; Nup represents a precursor of nucleophilic group; El represents an electrophilic center; Q represents a divalent group; Ball represents a ballast group; L$_2$ represents a linking group; and Ml represents an appropriate substituent.

Specific examples of this type of Y are described in JP-A-59-185333.

A still further type of the compound represented by the general formula (I) according to the present invention is a nondiffusible compound which decomposes to release a dye under a basic condition in the unexposed portion, but does not substantially release a dye when it undergoes cross oxidation with an oxidized form of a common reducing agent used in the photographic system in the exposed portion.

Examples of Y effective for this type of compound are those represented by the following general formula (YXVI):

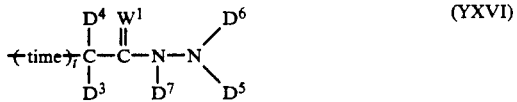

wherein D$^3$ and D$^4$ each represent a hydrogen atom or a substituted or unsubstituted alkyl group cycloalkyl group, alkenyl group, alkynyl group, aralkyl group, aryl group, or heterocyclic group; D$^5$ represents a substituted or unsubstituted alkyl group, cycloalkyl group, alkenyl group, alkynyl group, aralkyl group, aryl group, heterocyclic group, acyl group, alkoxycarbonyl group, aryloxycarbonyl group, carbamoyl group, sulfonyl group, or sulfamoyl group; D$^6$ and D$^7$ each represents a hydrogen atom or a substituted or unsubstituted acyl group, alkoxycarbonyl group, or aryloxycarbonyl group; W$^1$ represents an oxygen atom, a sulfur atom, or an imino group; (time) represents a timing group; and t represents 0 or 1.

Specific examples of this type of Y are described in JP-A-63-46450.

The ballast group in the general formulae (YI) to (YXIII) and (YXV) is an organic ballast group which can render the compound according to the present invention nondiffusible. Such a ballast group is preferably a group containing a hydrophilic group having from 8 to 32 carbon atoms. Such an organic ballast group is connected to the compound according to the present invention directly or via a linking group (for example, an imino bond, an ether bond, a thioether bond, a carbonamido bond, a sulfonamido bond, a ureido bond, an ester bond, a carbamoyl bond, a sulfamoyl bond, or a combination thereof).

Specific examples of such a ballast group include an alkyl group (for example, dodecyl, or octadecyl), an alkenyl group (for example, dodecenyl, or octadecenyl), an alkoxyalkyl group (for example, 3-(octyloxy)propyl, or 3-(2-ethylundecyloxy)propyl as described in JP-B-39-27563), an alkylaryl group (for example, 4-nonylphenyl, or 2,4-di-tert-butylphenyl), an alkylaryloxyalkyl group (for example, 2,4-di-tertpentyl-phenoxymethyl, α-(2,4-di-tert-pentylphenoxy) propyl, or 1-(3-pentadecylphenoxy)ethyl), an acylamidoalkyl group (for example, the groups as described in U.S. Pat. Nos. 3,337,344 and 3,418,129, or 2-(N-butylhexadecanamido)ethyl), an alkoxyaryl or aryloxyaryl group (for example, 4-(n-octadecyloxy)phenyl, or 4-(4-n-dodecylphenyloxy)phenyl), a residual group containing a long-chain aliphatic group such as an alkyl group or an alkenyl group and a water-solubilizing group such as a carboxyl group or a sulfo group (for example, 1-carboxymethyl-2-nonanedecenyl, or 1-sulfoheptadecyl), an alkyl group substituted with an ester group (for example, 1-ethoxycarbonylheptadecyl, or 2-(n-dodecyloxycarbonyl) ethyl), an alkyl group substituted with an aryl group or a heterocyclic group (for example, 2-[4-(3-methoxycarbonylunicosamido)phenyl]ethyl, or 2-[4-(2-n-octadecylsuccinimido)phenyl ethyl), and an aryl group substituted with an aryloxyalkoxycarbonyl group (for example, 4-[2-(2,4-di-tert-pentylphenyloxy)-2-methylpropyloxycarbonyl]phenyl).

Particularly preferred examples of these organic ballast groups include those connected to a linking group represented by the following general formula (B1), (B2), (B3) or (B4):

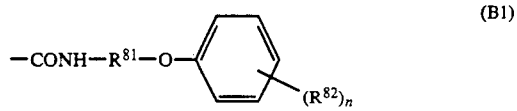 (B1)

 (B2)

 (B3)

 (B4)

wherein $R^{81}$ represents an alkylene group having from 1 to 10 carbon atoms, preferably having from 1 to 6 carbon atoms (for example, propylene, or butylene); $R^{82}$ represents a hydrogen atom or an alkyl group having from 1 to 10 carbon atoms, preferably having from 1 to 6 carbon atoms (for example, tert-amyl); n represents an integer of 1 to 5, preferably 1 or 2; $R^{83}$ represents an alkyl group having from 4 to 30 carbon atoms, preferably having from 10 to 20 carbon atoms (for example, dodecyl, tetradecyl, or hexadecyl); and $R^{84}$ represents an unsubstituted alkyl group having from 8 to 30 carbon atoms, preferably having from 10 to 20 carbon atoms (for example, hexadecyl, or octadecyl) or a substituted alkyl group having 1 or more carbon atoms in the alkyl moiety and 8 or more carbon atoms in total (examples of the substituent including a carbamoyl group).

Specific examples of the cyan dye providing compounds represented by the general formula (I) used in the present invention are set forth below, but the present invention should not be construed as being limited thereto.

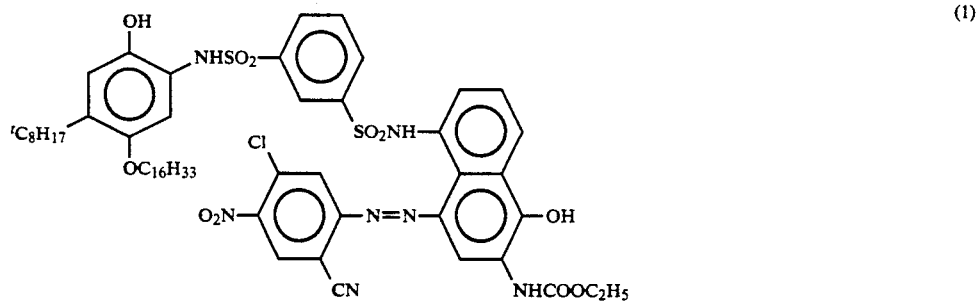

(1)

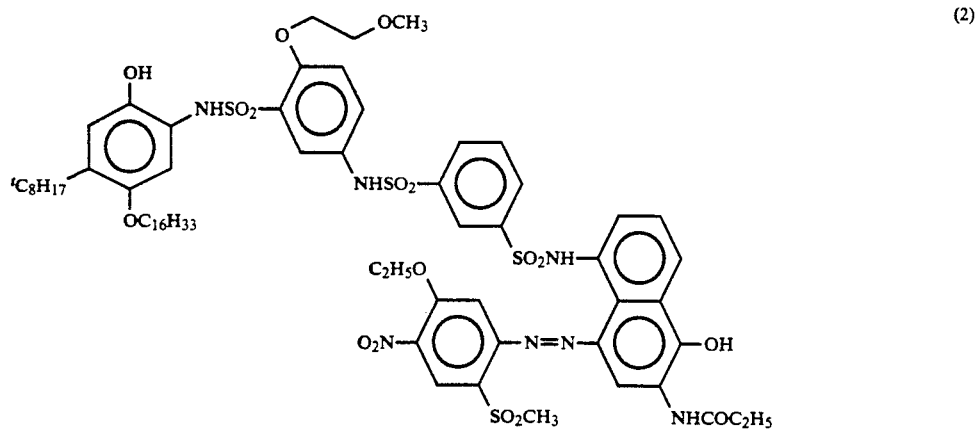

(2)

-continued
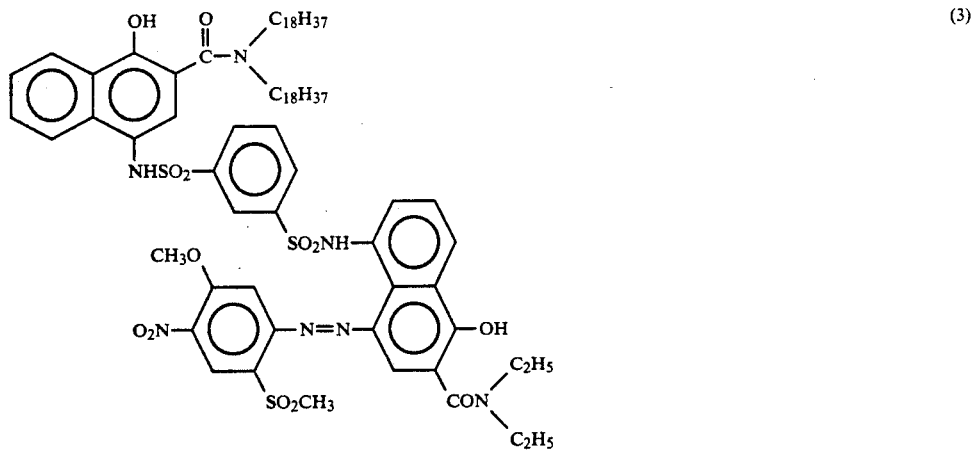
(3)
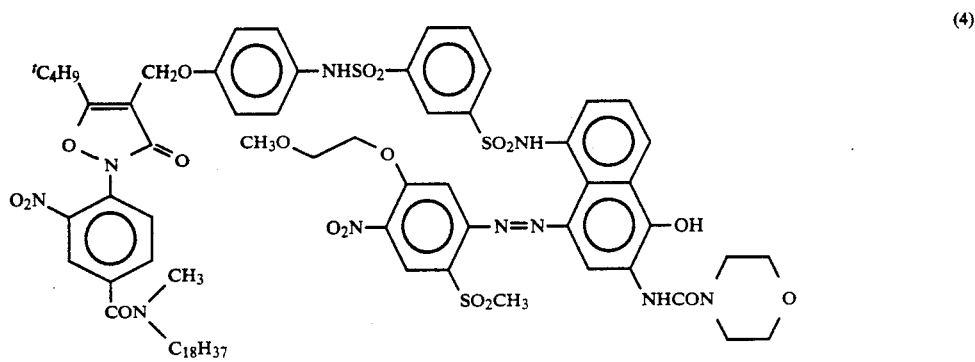
(4)
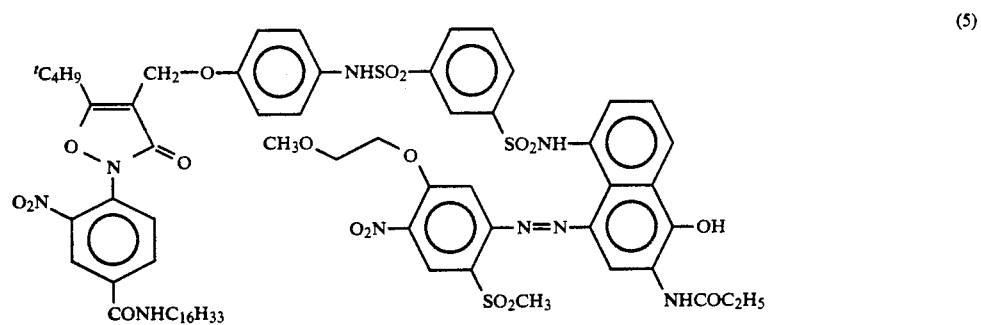
(5)
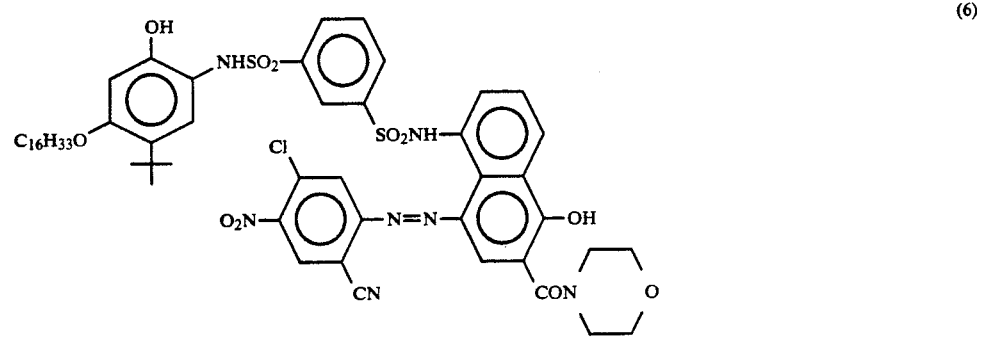
(6)

(7)
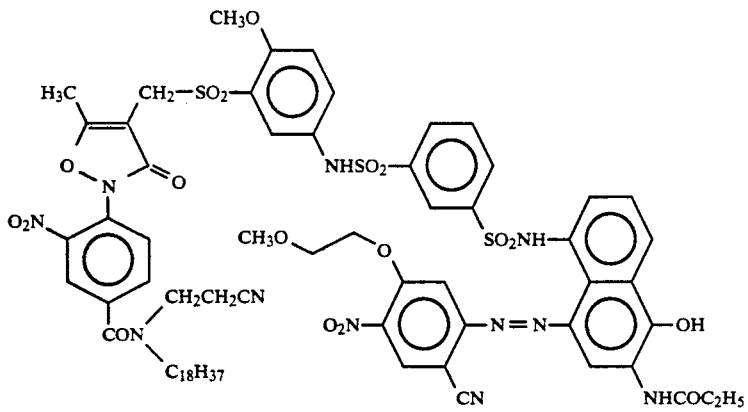
(8)
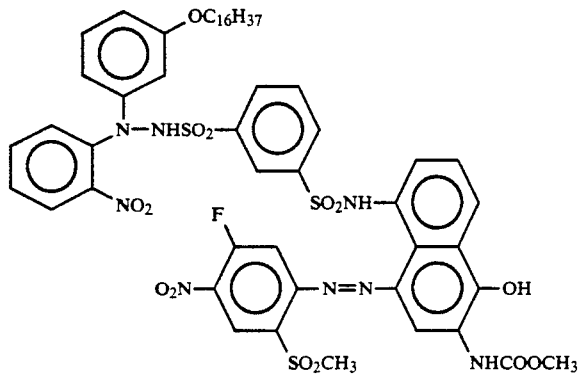
(9)
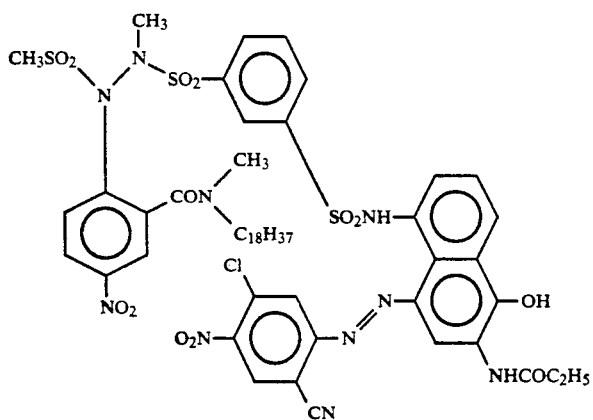
(10)
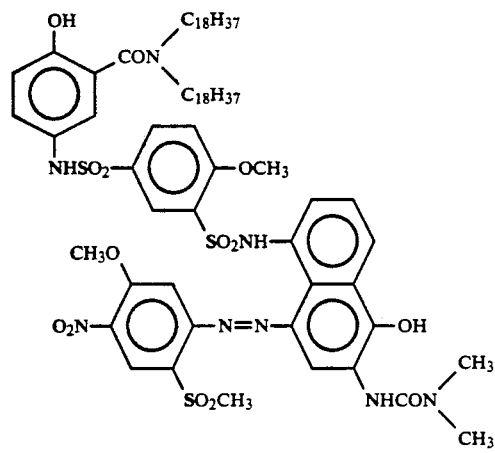

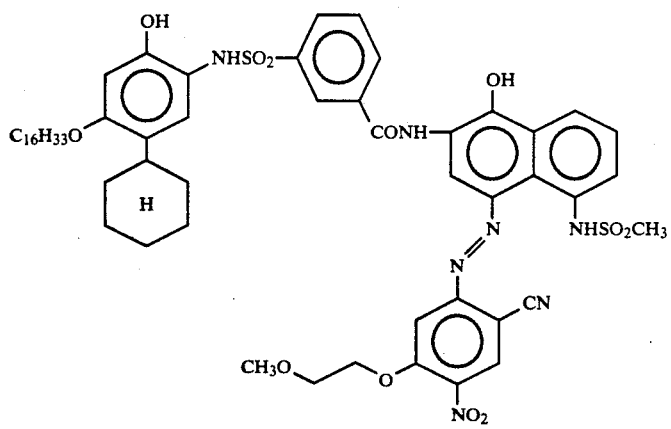
(11)
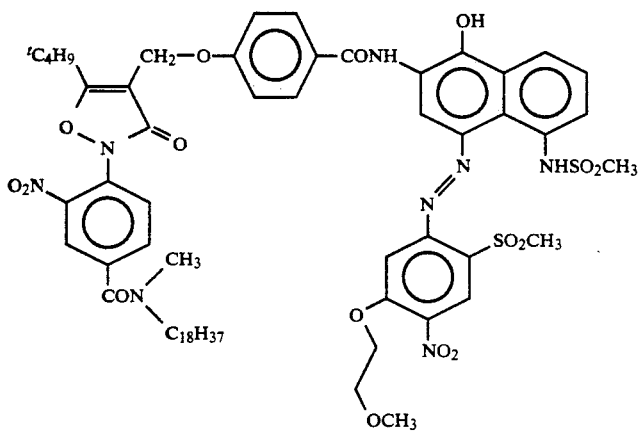
(12)
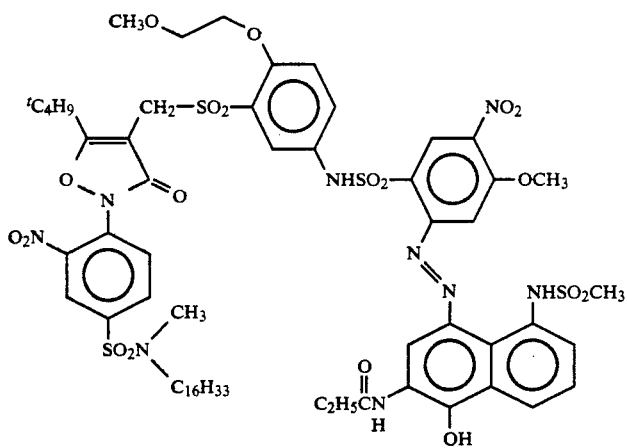
(13)
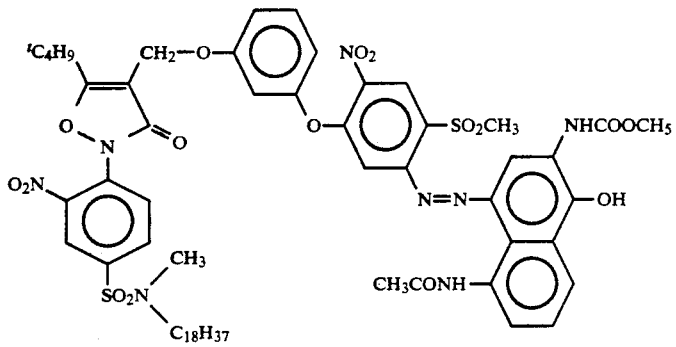
(14)

-continued
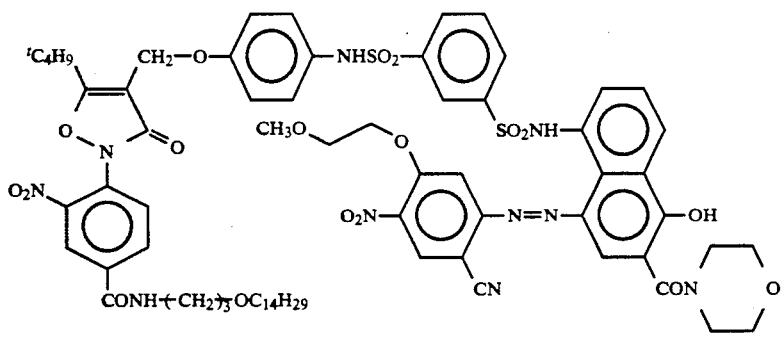
(15)
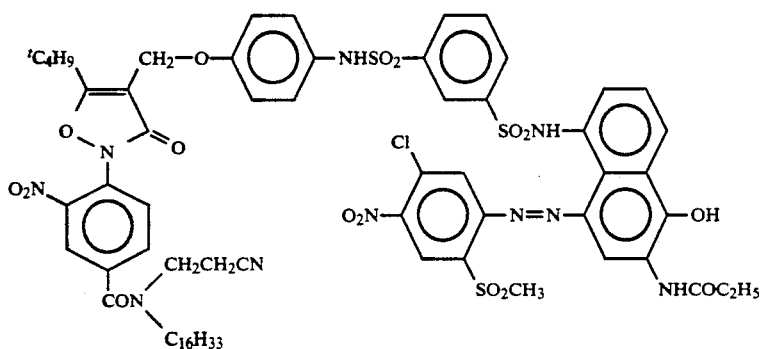
(16)
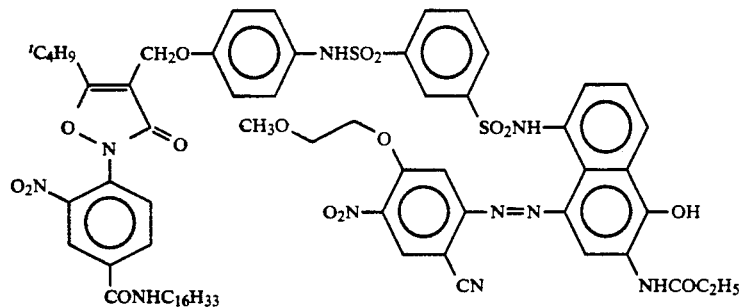
(17)
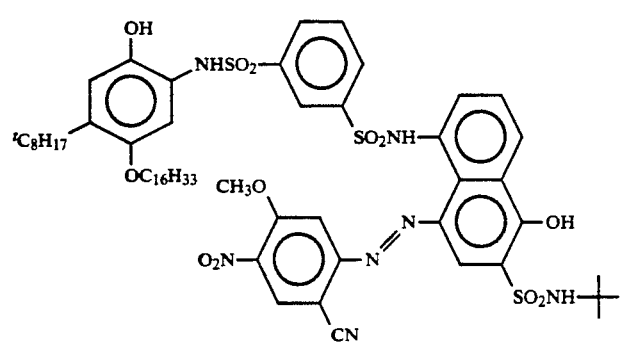
(18)

-continued
(19)
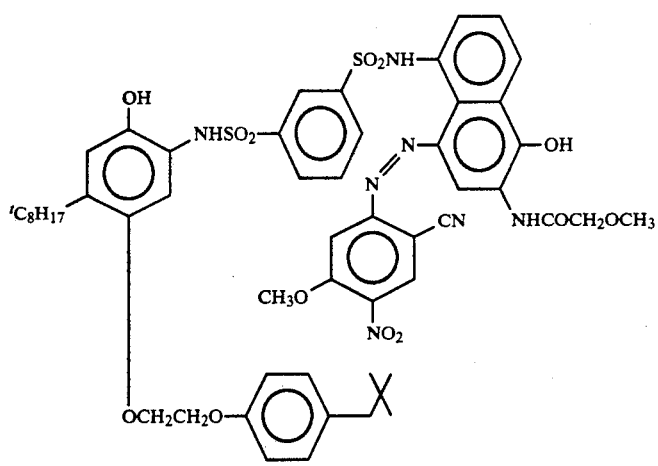
(20)
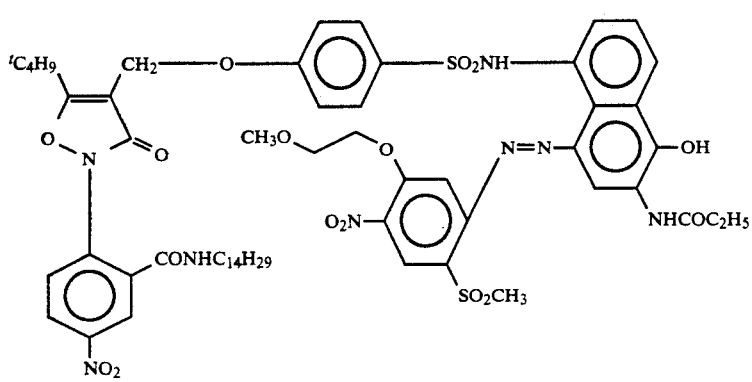
(21)
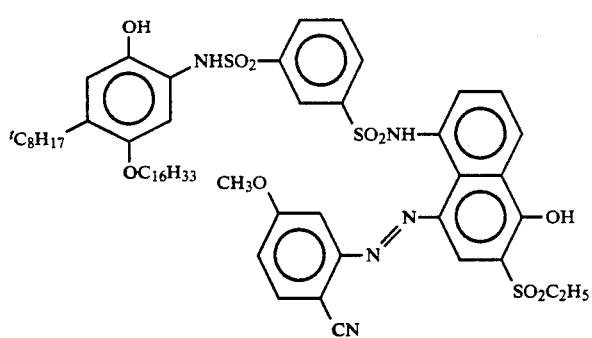
(22)
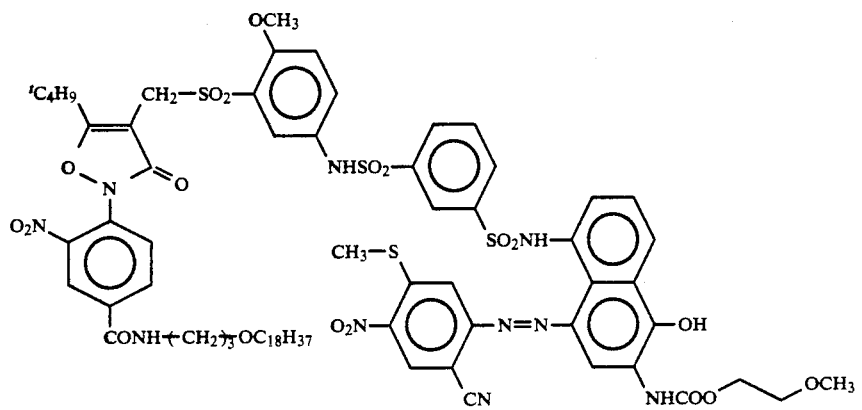

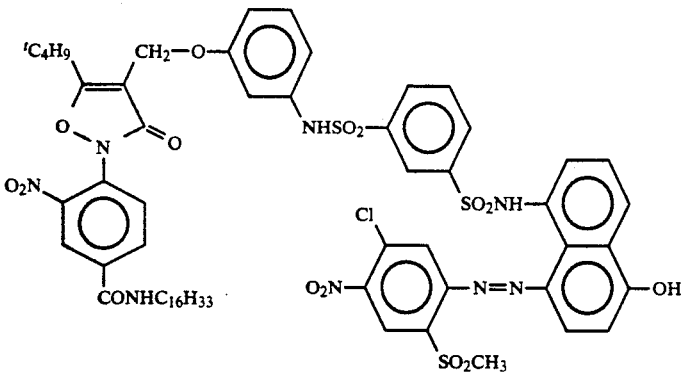

(23)

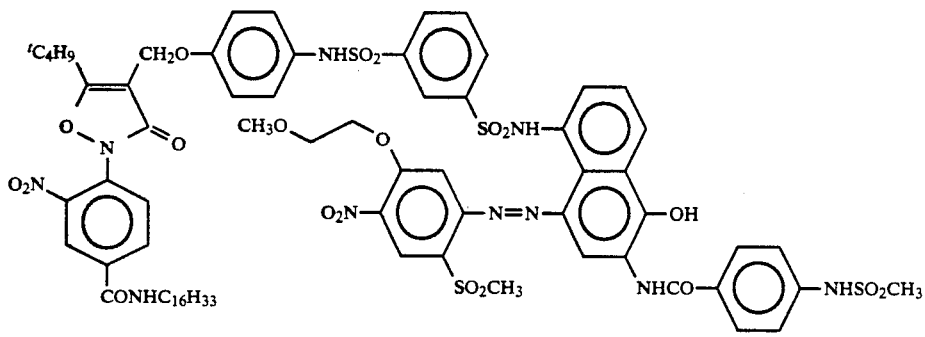

(24)

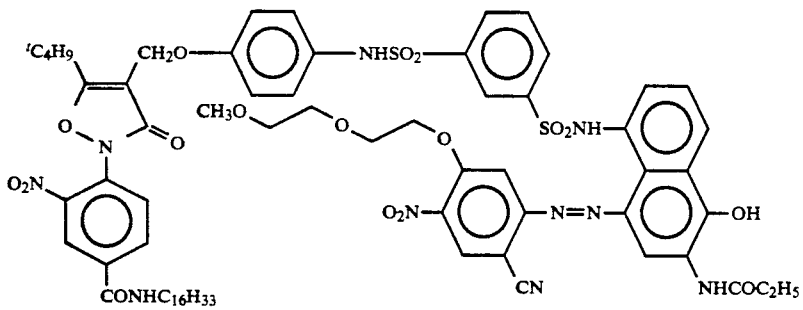

(25)

Now, synthesis methods of the compounds used in the present invention will be described hereinafter.

The compound according to the present invention is generally synthesized by forming a cyan dye by a coupling reaction of a diazonium salt of a p-nitroaniline derivative with a 1-naphthol derivative, and connecting the resulting cyan dye with a Y portion. More specifically, methods as described, for example, in U.S. Pat. Nos. 3,942,987, 4,273,708, 4,268,625 and 4,783,396 and JP-A-63-40152 can be employed for reference.

Specific examples of the synthesis of the compound used in the present invention will be described below.

SYNTHESIS EXAMPLE 1

Synthesis of Compound (5)

Step (1): Synthesis of 5-chloro-2-methylthionitrobenzene 192 g of 2,5-dichloronitrobenzene was dissolved in 600 ml of dimethylformamide, the resulting solution was heated to 60° C., and 600 ml of a 15% aqueous solution of sodium salt of methylmercaptan was added dropwise thereto. After being reacted for 2 hours, 2 liters of water was added to the reaction mixture, and the crystals thus-deposited were collected by filtration. The crystals obtained were employed in the following step without drying.

Step (2): Synthesis of 5-chloro-2-methanesulfonylnitrobenzene

The chloro-2-methylthionitrobenzene obtained in Step (1) above was added to 1 liter of acetic acid and the mixture was stirred. After 10 g of sodium tungstate was added to the mixture, the mixture was heated to 65° C., and 233 ml of a 35% aqueous hydrogen peroxide was added dropwise thereto. After being reacted at 85° C. for 6 hours, the reaction mixture was poured into ice water to obtain crystals. Yield: 192 g (81.5%) through Steps (1) and (2). Melting point: 145° C.

Step (3): Synthesis of 5-chloro-2-methanesulfonylacetanilide

To a mixture of 23.6 g of 5-chloro-2-methanesulfonylnitrobenzene obtained in Step (2) and 150 ml of isopropyl alcohol, were added 10 g of ammonium chloride and 50 ml of water. After being heated to 70° C., 50 g of metal iron divided into 10 parts was added to the mixture. After the completion of the addition, the mixture was refluxed by heating for 2 hours. Then, the reaction mixture was filtered while it was hot to remove iron and iron salts. The filtrate was cooled to 30° C., 30 ml of acetic anhydride was added thereto, and the mixture was stirred for 1.5 hours, then water was added thereto to obtain crystals. Yield: 18.0 g (72.7%). Melting point: 155° C.

Step (4): Synthesis of 5-chloro-2-methanesulfonyl-4-nitroacetanilide 15 g of 5-chloro-2-methanesulfonylacetanilide obtained in Step (3) above was carefully added little by little to 50 ml of fuming nitric acid while the temperature was maintained at 0° C. or below. After the completion of the addition, the mixture was maintained at 0° C. or below for 1 hour, and then poured into 0.5 liters of ice water. The crystals thus-deposited were thoroughly washed with water and dried. Yield: 12.2 g (68.8%). Melting point: a definite melting point was not observed (gradually decomposed around 160° C.)

Step (5): Synthesis of 5-(2-methoxyethoxy)-2-methanesulfonyl-4-nitroaniline

To a mixture of 12 g of the crystals obtained in Step (4) above and 100 ml of 2-methoxyethanol was added 5.6 g of potassium hydroxide, and the mixture was refluxed by heating for 3 hours. The reaction mixture was cooled whereby light yellow crystals were deposited. The crystals were collected by filtration, mixed with acetonitrile, and the mixture was stirred at room temperature for 1 hour and then again filtered to obtain crystals. Yield: 7.8 g (65.5%). Melting point: 166 to 167° C.

Step (6): Synthesis of 5-(3-sulfophenylsulfonylamino)-4-{5-(2-methoxyethoxy)-2-methanesulfonyl-4-nitrophenylazo}-2-propionylamino-1-naphthol

Step (6)-1: Preparation of Solution (A)

A mixture of 10 g of 5-(2-methoxyethoxy)-2-methanesulfonyl-4-nitroaniline, 50 ml of concentrated hydrochloric acid and 10 ml of water was stirred and cooled to 5° C. or below, and 10 ml of an aqueous solution containing 3.1 g of sodium nitrile was added dropwise thereto. After being reacted for 1 hour, 1 g of sulfamic acid was added thereto. The resulting reaction solution was designated Solution (A).

Step (6)-2: Synthesis of Dye (A)

Dye (A):

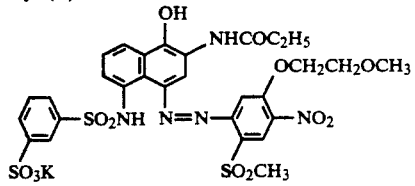

12.5 g of potassium salt of 5-(3-sulfophenylsulfonylamino)-2-propionylamino-1-naphthol, 94 ml of methanol and 94 ml of water were mixed and stirred. The resulting solution was cooled to 0° C., Solution (A) prepared in Step (6)-1 above was gradually added dropwise thereto. After 1 hour, a solution containing 3.9 g of sodium hydroxide dissolved in 57 ml of water was added dropwise to the reaction mixture to deposit crystals. After being stirred for 1 hour, the deposited crystals were collected by filtration, and washed with 50 ml of methanol. Yield: 15.3 g (73.0%). Melting point: above 250° C.

Step (7): Synthesis of Dye (B)

Dye (B):

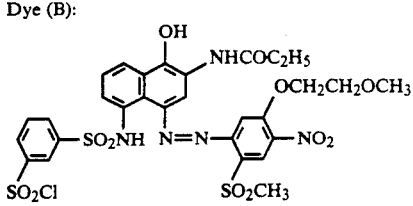

To a mixture of 10 g of Dye (A), 100 ml of acetonitrile and 50 ml of dimethylacetamide, which was maintained at 40° C. or below, was added dropwise 10.5 ml of phosphorus oxychloride. After being stirred at 55° C. for 1 hour, the mixture was poured into 500 ml of ice water. After being stirred at 10° C. or below for 1 hour, the crystals thus-deposited were collected by filtration and washed with water. The crystals obtained were mixed with 50 ml of acetonitrile, the mixture was stirred at 5° C. for 1 hour, then filtered to obtain crystals which were washed with acetonitrile. Yield: 9.7 g (99.0%). Melting point: 212° to 214° C.

Step (8): Synthesis of Compound (5)

A mixture of 8.9 g of Compound (C) described below and 36 ml of dimethylacetamide was stirred and cooled at 0° C., to which was added 3.2 ml of pyridine. To the resulting solution was added little by little Dye (B) obtained in Step (7) above and the mixture was reacted for 1 hour. 64 ml of acetate and 80 ml of methanol were added thereto, the mixture was heated to 60° C., and 57 ml of water was added dropwise thereto to deposit crystals. The crystals obtained were washed with methanol, and purified by recrystallization from a mixture of dimethylacetamide, acetone, methanol and water. Yield: 8.3 g. Melting point: 149° C.

Compound (C):

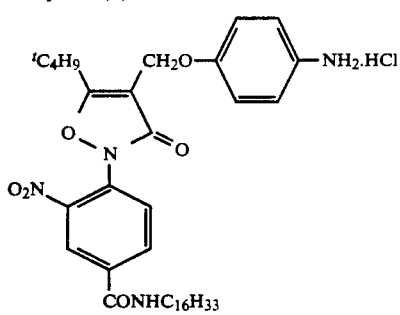

SYNTHESIS EXAMPLE 2

Synthesis of Compound (25)

Step (1): Synthesis of 2-amino-4-chlorobenzamide 190 g of 2,4-dichlorobenzamide was dissolved in 1.5 liters of aqueous ammonia, and to the resulting solution was added 100 g of cuprous chloride. The mixture was reacted at 80° C. for 15 hours in an autoclave, and then neutralized. The crystals deposited were collected by filtration. Yield: 122 g (71.5%)

Step (2): Synthesis of 2-amino-4-chlorobenzonitrile 85.3 g of 2-amino-4-chlorobenzamide obtained in Step (1) was dissolved in 350 ml of pyridine, and to the resulting solution, while maintaining it at 10° to 20° C., there was added dropwise 92 g of phosphorus oxychloride. After being reacted at room temperature for 1 hour, the reaction mixture was poured into ice water. The crystals thus-deposited were collected by filtration, washed with water and dried. Yield: 39 g (51.1%).

Step (3): Synthesis of 2-acetylamino-4-chlorobenzonitrile

To 100 ml of acetonitrile were added 30 g of 2-amino-4-chlorobenzonitrile obtained in Step (2) and then 30 ml of acetic anhydride, and the mixture was refluxed by heating. After the completion of the reaction, the solvent was distilled off, then to the residue was added 500 ml of water, and the crystals thus-deposited were collected by filtration, washed with water and dried. Yield: 29 g (75.6%).

Step (4): Synthesis of 2-acetylamino-4-chloro-5-nitrobenzonitrile 25 g of 2-acetylamino-4-chlorobenzonitrile obtained in Step (3) above was added little by little to 200 ml of fuming nitric acid which had been cooled at 0° C. After the completion of the addition, the mixture was reacted for 30 minutes, and then the reaction solution was poured into 1 liter of ice water. The crystals thus-deposited were collected by filtration, washed thoroughly with water and dried. Yield: 22.2 g (72.4%).

Step (5): Synthesis of 2-amino-4-[2-(2-methoxyethoxy)ethoxy]-5-nitrobenzonitrile 20 g of 2-acetylamino-4-chloro-5-nitrobenzonitrile obtained in Step (4) above was mixed with 110 ml of diethyleneglycol monomethyl ether, 11.4 g of potassium hydroxide was added thereto, and the mixture was reacted at 80° C. for 4 hours. After the completion of the reaction, the reaction mixture was cooled, then 250 ml of water was added thereto with stirring. The crystals thus-deposited were collected by filtration, washed with a mixture of water and methanol (1:1) and dried. Yield: 14.5 g (53.7%). Melting point: 106° to 108° C.

Step (6): Synthesis of Compound (25)

Using the aniline obtained in Step (5) above, Compound (25) was synthesized according to the methods as described in Synthesis Example 1 above. Melting point: 189° C.

The amount of the dye image forming compound used according to the present invention can be varied over a wide range, but it is ordinarily from 0.01 mol to 4 mol, preferably 0.05 mol to 2 mol per mol of silver.

The above described image forming compound and hydrophobic additives such a the image formation accelerators described hereinafter ca be incorporated into the layers of the light-sensitive element by any known suitable method as described, for example, in U.S. Pat. No. 2,322,027. In this case, an organic solvent having a high boiling point as described, for example, in JP-A-59-83154, JP-A-59-178451, JP-A-59-178452, JP-A-59-178453, JP-A-59-178454, JP-A-59-178455 and JP-A-59-178457 can be used, if desired, in combination with a low boiling organic solvent having a boiling point of 50° to 160° C.

The amount of the organic solvent having a high boiling point to be used is normally 10 g or less, preferably 5 g of less per 1 g of dye image forming compound employed.

Alternatively, a dispersion process using a polymer as described in JP-B-51-39853 and JP-A-51-59943 can be used.

If the compound is substantially insoluble in water, it can be dispersed as fine particles in a binder.

If a hydrophobic substance is dispersed in a hydrophilic colloid, various surface active agents can be used. For example, surface active agents as described in JP-A-59-57636, pages 37 to 38 can be used.

The dye image forming compound according to the present invention can be used in a light-sensitive element for the color diffusion transfer process which is developed with a processing solution at room temperature, as well as in a heat-developable light-sensitive element which can be developed by heating.

The silver halide which can be used in the above described light-sensitive element may be silver chloride, silver bromide, silver chlorobromide, silver chloroiodide, silver chloroiodobromide, or silver bromoiodide.

Specifically, any suitable silver halide emulsion as described, for example, in U.S. Pat. No. 4,500,626, column 50, Research Disclosure, No. 17029 (June, 1978, page 9 to 10), and JP-A-61-107240, JP-A-62-85241 and JP-A-62-87957 can be used.

The silver halide emulsion to be used in the present invention may be of the surface latent image type in which a latent image is formed mainly on the surface of particles, or the internal latent image type in which a latent image is formed mainly in the interior of particles. Alternatively, the silver halide emulsion may be a so-called core-shell emulsion in which the inner portion and the surface portion of the particles have different phases. Furthermore, a direct reversal emulsion comprising a combination of an internal latent image type emulsion and a nucleating agent and/or light fogging can be used.

The silver halide emulsion may be used unripened, but is normally subjected to chemical sensitization before use. The emulsion can be subjected to a sulfur sensitization process, reduction sensitization process, and noble metal sensitization process, singly or in combination known for the ordinary type light-sensitive material. These chemical sensitization processes can be effected in the presence of a nitrogen-containing heterocyclic compound as described in JP-A-58-126526 and JP-A-58-215644.

The coating amount of the light-sensitive silver halide used in the present invention can be from 1 mg/m$^2$ to 10 g/m$^2$ in terms of silver.

The silver halide which can be used in the present invention may be subjected to spectral sensitization with a methine dye or the like dye. Examples of such a dye include a cyanine dye, a merocyanine dye, a complex cyanine dye, a complex merocyanine dye, a holopolar cyanine dye, a hemicyanine dye, a styryl dye, and a hemioxonol dye.

Specific examples of these dyes include sensitizing dyes as described, for example, in JP-A-59-180550, JP-A-60-40335, and Research Disclosure, No. 17029 (June 1978, pages 12 to 13), and heat-decolorable sensitizing dyes as described, for example, in JP-A-60-111239 and JP-A-62-32446.

In the light-sensitive material of the present invention, yellow and magenta image forming compounds having the group Y, i.e., the substrate with the same functions as that of the compound of the general formula (I) or a known cyan dye forming compound may be used in combination with the compound of the general formula (I).

As a suitable die image forming compound which may be used in combination with the compound according to the present invention, there can be used a coupler which can react with a developing agent. In the process of using such a coupler, the oxidation-reduction reaction of a silver salt with a developing agent produces an oxidation product of the developing agent which will then react with the coupler to form a dye. Such a process is described in many prior publications. Such a coupler may be a four-equivalent coupler or a two-equivalent coupler. A two-equivalent coupler containing a diffusion resistant group in a releasing group, which forms a diffusible dye upon reaction with an oxidation product of a developing agent is preferably used. Specific examples of such a developing agent and such a coupler are described in detail, for example, in *The Theory of the Photographic Process* (T. H. James, 4th edition, pages 291 to 334 and 354 to 361), JP-A-58-123533, JP-A-58-149046, JP-A-58-149047, JP-A-59-111148, JP-A-59-124399, JP-A-59-174835, JP-A-59-231539, JP-A-59-231540, JP-A-60-2950, JP-A-60-2951, JPA-60-14242, JP-A-60-23474 and JP-A-60-66249.

Other examples of a suitable dye image forming compound which may be used in combination with the compound according to the present invention include a dye-silver compound obtained by combining an organic silver salt with a dye. Specific examples of such a dye-silver compound are described, for example, in *Research Disclosure*, No. 16966 (May 1978, pages 54 to 58).

A further example of a suitable dye image forming compound which may be used in combination with the compound according to the present invention is an azo dye for use in a heat developable silver dye bleach process. Specific examples of such an azo dye and bleach process are described, for example, in U.S. Pat. No. 4,235,957, and *Research Disclosure*, No. 14433 (April 1976, pages 30 to 32). Leuco dyes as described, for example, in U.S. Pat. Nos. 3,985,565 and 4,022,617 may be used as the dye providing substance.

Another example of a suitable dye image forming compound which may be used in combination with the compound according to the present invention is a compound which imagewise releases or diffuses a diffusible dye.

This type of a compound can be represented by the following general formula (LI):

$(Dye'—X')_n\!\!-\!\!Y'$             (LI)

wherein Dye' represents a dye group represented by the general formula (II), a known dye group, a dye group whose hue has been temporarily shifted to a short wavelength range, or a dye precursor: X' represents a chemical bond or a linking group; Y' represents a group which makes a difference in diffusibility between the compound represented by $(Dye'—X')_n—Y'$ in correspondence or countercorrespondence to development of a light-sensitive silver salt having an imagewise latent image or releases Dye' to make a difference in diffusibility between Dye' thus released and $(Dye'—X')_n—Y'$; and n represents an integer of 1 or 2, when n is 2, two (Dye'—X') groups may be the same or different.

Specific examples of the dye providing compound represented by the general formula (LI) which can be used in the present invention include a dye developer comprising a linkage of a hydroquinone developing agent and a dye component as described, for example, in U.S. Pat. Nos. 3,134,764, 3,362,819, 3,597,200, 3,544,545 and 3,482,972. Furthermore, a dye providing compound which undergoes an intramolecular nucleophilic substitution reaction to release a diffusible dye is described, for example, in JP-A-51-63618. A dye providing compound which undergoes an intramolecular rewinding reaction of an isoxazolone ring to release a diffusible dye is described, for example, in JP-A-49-111628. In these systems, a diffusible dye is released or diffused in the undeveloped portion, while it is neither released nor diffused in the developed portion.

In another system, a dye releasing compound in the oxidized form which is not capable of releasing is coexistent with a reducing agent or its precursor. Such a dye releasing compound is reduced by the reducing agent which remains unoxidized after development to release a diffusible dye. Specific examples of a dye image forming compound which is used in such a system are described, for example, in JP-A-53-110827, JP-A-54-130927, JP-A-56-164342 and JP-A-53-35533.

Examples of a dye providing compound which releases a diffusible dye in the developed portion include a dye providing compound which releases a diffusible dye upon reaction of a coupler containing a diffusible dye as a releasing group with an oxidation product of a developing agent, as described, for example, in British Patent 1,330,524, JP-B-48-39165 and U.S. Pat. No. 3,443,940.

Systems using color developing agents often suffer from a serious problems of contamination of image by products of oxidation decomposition of the developing agent. In order to solve this problem, a dye releasing compound which requires no developing agent and has a reducing power itself has been proposed. Typical examples of such a dye releasing compound include dye image forming compounds as described, for example, in U.S. Pat. Nos. 3,928,312, 4,053,312, 4,055,428, 4,336,322, 3,725,062, 3,728,113, 3,443,939 and 4,500,626, JP-A-59-65839, JP-A-59-69839, JP-A-53-3819, JP-A-51-104343, JP-A-58-116537, JP-A-57-179840 and *Research Disclosure*, No. 17465.

If the color light-sensitive material of the present invention is applied to the system which comprises forming an image by diffusion transfer of a dye, a light-sensitive element and an image receiving element or dye fixing element are essential. Typical forms of such a construction are roughly classified into a form in which the light-sensitive element and the dye fixing element are separately coated on two supports, and a form in which the two elements are coated on the same support.

The relationship between the light-sensitive element and the dye fixing element, between the light-sensitive element and the support, and between the light-sensitive element and a white reflecting layer as described in JP-A-61-147244, pages 58 to 59 and U.S. Pat. No. 4,500,626, column 59 can be applied to the present invention.

A typical form of the film unit in which the light-sensitive element and the image receiving element or dye fixing element are provided on the same support is a form in which a light-sensitive element and an image receiving element are laminated on a transparent support so that it is not necessary to peel the light-sensitive element off the image receiving element after the completion of image transfer. More particularly, the image receiving element comprises at least one mordant layer, and a preferred embodiment of the light-sensitive element comprises a combination of a blue-sensitive emulsion layer, a green-sensitive emulsion layer, and a red-sensitive emulsion layer; a combination of a green-sensitive emulsion layer, a red-sensitive emulsion layer, and an infrared sensitive element layer; or a combination of a blue-sensitive emulsion layer, a red-sensitive emulsion layer, and an infrared sensitive emulsion layer, each being associated with a yellow dye image forming compound, a magenta dye image forming compound, and a cyan dye image forming compound, respectively (the term "infrared sensitive emulsion layer" as used herein means an emulsion layer having a sensitivity to light of a wavelength of 700 nm or greater, particularly 740 nm or greater). Each of these light-sensitive emulsion layers may be optionally divided into two or more layers. A white reflecting layer containing a solid pigment such as titanium oxide is provided interposed between the mordant layer and the light-sensitive layer or dye image forming compound-containing layer so that the transfer image can be observed through the transparent support. A light shielding layer may be provided interposed between the white reflecting layer and the light-sensitive layer in order to perform the development processing in the light. Furthermore, a peel layer may be optionally provided in a proper position so that the light-sensitive element can be entirely or partially peeled off the image receiving element, if desired. Such an embodiment is described in JP-A-56-67840 and Canadian Patent 674,082.

In another form of the construction which does not require peeling, the above described light-sensitive element is coated on a transparent support. A white reflecting layer is coated on the light-sensitive layer. Furthermore, an image receiving layer is laminated on the white reflecting layer. A form of the construction in which an image receiving element, a white reflecting layer, a peel layer, and a light-sensitive element are laminated on the same support so that the light-sensitive element can be intentionally peeled off the image receiving element is described in U.S. Pat. No. 3,730,718.

On the other hand, typical forms of the construction in which a light-sensitive element and an image receiving element are separately coated on two supports are roughly classified into two forms, i.e., peel apart type and non-peel apart type. More particularly, a preferred form of the peel apart type film unit comprises at least one image receiving layer provided on one surface of a support and a light reflecting layer provided on the opposite side of the support. The light-sensitive element is provided on a support having a light shielding layer. The light-sensitive layer side of the support and the mordant layer side are not opposed to each other before the exposure is conducted. After the exposure is finished (e.g., during the development), the light-sensitive layer side is turned over and superposed on the image receiving layer side. Once a transfer image is completed on the mordant layer, the light-sensitive element is rapidly peeled off the image receiving element.

A preferred form of the non-peel apart type film unit comprises at least one mordant layer provided on a transparent support. The light-sensitive element is provided on a transparent support or a support having a light shielding layer. The light-sensitive layer side and the mordant layer side are superposed on each other face to face.

These forms can be applied to both the color diffusion transfer process and the heat development process. Particularly, if these forms are applied to the former process, these forms of the construction may comprise pressure-rupturable containers (processing element) containing an alkaline processing solution. More particularly, in the non-peel apart type film unit comprising a lamination of an image receiving element and a light-sensitive element provided on a support, the processing element is preferably provided interposed between the light-sensitive element and a cover sheet superposed thereon. In the form of construction in which a light-sensitive element and an image receiving element are separately provided on two supports, the processing element is preferably put between the light-sensitive element and the image receiving element not later than the development. The processing element preferably contains a light shielding agent (for example, carbon black, a dye which is subject to color change due to pH change) and/or a white pigment (for example, titanium oxide) depending on the form of the film unit. In the film unit for use in the color diffusion transfer process, a neutralization timing mechanism comprising a combination of a neutralizing layer and a neutralization timing layer is preferably incorporated in the cover sheet, the image receiving element, or the light-sensitive element.

A preferred example of the mordant which may be used in the above described image receiving element or the dye fixing element described hereinafter is a polymer mordant. The term "polymer mordant" as used herein means a polymer containing tertiary amino groups, a polymer containing nitrogen-containing heterocyclic portions, or a polymer containing quaternary cationic groups thereof.

Specific examples of such a polymer mordant are described in JP-A-61-147244, pages 98 to 100 and U.S. Pat. No. 4,500,626, columns 57 to 60.

When the present invention is applied to a heat developable light-sensitive material, an organic metal salt can be used as an oxidizing agent in combination with a silver halide. In this case, it is necessary that the light-sensitive silver halide and the organic metal salt be in contact with or in close proximity to each other.

Among these organic metal salts, an organic silver salt is particularly preferably employed.

Examples of organic compounds which can be used to form such an organic silver salt oxidizing agent include compounds as described in JP-A-61-107240, pages 37 to 39 and U.S. Pat. No. 4,500,626, columns 52 to 53. Other useful examples of such organic compounds include silver salts of carboxylic acids containing an alkynyl group such as silver phenylpropiolate, and acetylene silver as described in JP-A-61-249044. The organic silver salts may be used in combination.

The organic silver salt can be used in an amount of from 0.01 to 10 mol, preferably from 0.01 to 1 mol per mol of light-sensitive silver halide. The sum of the coating amount of the light-sensitive silver halide and the organic silver halide is usually from 50 mg/m$^2$ to 10 g/m$^2$ in terms of silver.

The above described dye image forming compounds which are used in combination with the image forming compound according to the present invention and hydrophobic additives such as the image formation accelerators described hereinafter can be incorporated into the layers of the light-sensitive element by any known suitable method as described, for example, in U.S. Pat. No. 2,322,027. In this case, an organic solvent having a high boiling point as described, for example, in JP-A-59-83154, JP-A-59-178451, JP-A-59-178452, JP-A-59-178453, JP-A-59-178454, JP-A-59-178455 and JP-A-59-178457 can be used, if desired, in combination with a low boiling organic solvent having a boiling point of 50° to 160° C.

The amount of the organic solvent having a high boiling point to be used is normally 10 g or less, preferably 5 g of less per 1 g of dye image forming compound employed.

Alternatively, a dispersion process using a polymer as described in JP-B-51-39853 and JP-A-51-59943 can be used.

If the compound is substantially insoluble in water, it can be dispersed as fine particles in a binder.

If a hydrophobic substance is dispersed in a hydrophilic colloid, various surface active agents can be used. For example, surface active agents as described in JP-A-59-157636, pages 37 to 38 can be used.

In the present invention, it is preferred that a reducing substance is incorporated into the light-sensitive element. Examples of such a reducing substance include compounds commonly known as reducing agents and the above described dye image forming compounds having a reducing power. Other useful examples of such a reducing substance include a reducing agent precursor which does not have a reducing power itself but exhibit a reducing power when acted on by a nucleophilic reagent or heat during the development.

Examples of reducing agents which may be used in the present invention include reducing agents as described, for example, in U.S. Pat. Nos. 4,500,626, columns 49 to 50 and 4,483,914 columns 30 to 31, JP-A-60-140335, pages 17 to 18, JP-A-60-128438, JP-A-60-128436, JP-A-60-128439 and JP-A-60-128437. Reducing agent precursors as described, for example, in JP-A-56-138736, JP-A-57-40245 and U.S. Pat. No. 4,330,617 can be used.

Combinations of various reducing agents as described in U.S. Pat. No. 3,039,869 can be utilized.

In the present invention, the amount of the reducing agent added is preferably from 0.01 mol to 20 mol, particularly from 0.1 mol to 10 mol per mol of silver.

In the present invention, the light-sensitive element may contain a compound which serves to activate the development as well as to stabilize the image. Specific examples of such a compound useful in the present invention are described in U.S. Pat. No. 4,500,626, columns 51 to 52.

In the present invention, various antifoggants or photographic stabilizers can be used. Examples of such antifoggants or photographic stabilizers include azoles and azaindenes as described in Research Disclosure (Dec. 1978, pages 24 to 25), carboxylic acids and phosphoric acids containing nitrogen as described in JP-A-59-168442, mercapto compounds and metal salts thereof as described in JP-A-59-111636, and acetylene compounds as described in JP-A-62-87957.

In the present invention, the light-sensitive element may contain a toning agent, if desired. Specific examples of useful toning agents include compounds as described in JP-A-61-147244, pages 92 to 93.

In order to obtain a wide range of colors in the chromaticity diagram using three primary colors, i.e., yellow, magenta and cyan, a light-sensitive element comprising at least three silver halide emulsion layers having a light-sensitivity in different spectral regions may be used. Examples of such a light-sensitive element include a combination of a blue-sensitive layer, a green-sensitive layer, and a red-sensitive layer, and a combination of a green-sensitive layer, a red-sensitive layer, and an infrared sensitive layer. Each of these light-sensitive layers may comprise two or more layers.

The light-sensitive element used in the present invention may contain various known additives, such as those for heat developable light-sensitive elements or layers other than light-sensitive layers such as a protective layer, an intermediate layer, an antistatic layer, an antihalation layer, a peel layer for facilitating peeling of the light-sensitive element off the dye fixing element, and a matting layer, if desired. Examples of such additives include plasticizers, matting agents, sharpness improving dyes, antihalation dyes, surface active agents, fluorescent brightening agents, non-slipping agents, antioxidants and color fading preventing agents as described, for example, in Research Disclosure (June 1978, pages 9 to 15) and JP-A-61-88256.

Particularly, a protective layer ordinarily contains an organic or inorganic matting agent to inhibit adhesion. The protective layer also may contain a mordant or ultraviolet light absorber. The protective layer and the intermediate layer each may consist of two or more layers.

The intermediate layer may contain a reducing agent for preventing color fading or color mixing, an ultraviolet light absorber, or a white pigment such as titanium oxide. In order to increase the sensitivity, such a white pigment may be incorporated into an emulsion layer as well as in the intermediate layer.

The dye fixing element may comprise an auxiliary layer such as a protective layer, a peel layer, and an anticurling layer, if desired. Particularly preferably a protective layer is provided. One or more of these auxiliary layers may contain a hydrophilic thermal solvent, a plasticizer, a color fading preventing agent an ultraviolet light absorber, a lubricant, a matting agent, an antioxidant, a dispersed vinyl compound for improving dimensional stability, a surface active agent, or a fluorescent brightening agent. Particularly, in the system in which the heat development and the dye transfer are effected at the same time in the presence of a small amount of water, the dye fixing element preferably contains a base and/or a base precursor described hereinafter to improve preservability of the light-sensitive element. Specific examples of these additives are described in JP-A-61-88256, pages 101 to 120.

In the present invention, the light-sensitive element and/or dye fixing element may contain an image formation accelerator. Such an image formation accelerator serves to accelerate the redox reaction of a silver salt oxidizing agent with a reducing agent, the formation of a dye from a dye providing compound or the decomposition of the dye, the release of a diffusible dye, or the migration of a dye form the light-sensitive material layer to the dye fixing layer. From the physicochemical standpoint, such image formation accelerators are classified into the following categories: a base or base precursor, a nucleophilic compound, a high boiling organic solvent (oil), a thermal solvent, a surface active agent, or a compound which mutually acts on silver or silver ion. However, these materials generally have composite functions and thus have a combination of the above described acceleration effects. Such image formation accelerators are described in detail in JP-A-61-93451, pages 67 to 71.

There have been proposed some other methods for generating a base. Any compounds used in these method are useful as base precursors. Examples of such methods include a method which comprises mixing a difficulty soluble metallic compound with a compound capable of forming complexes with meal ions constituting the metallic compound (complex forming compound) to produce a base, and a method as described in U.S. Pat. No. 4,740,455 which comprises electrolysis to produce a base.

The former method is particularly effective. Examples of the difficultly soluble metallic compound include carbonates, hydroxides, and oxides of zinc, aluminum, calcium, and barium. Examples of the complex forming compounds are described in detail, for example, in *Critical Stability Constants* (edited by A. E. Martell and R. M. Smith, Vol. 4 and Vol. 5, Plenum Press). Specific examples of such complex forming compounds include salts of aminocarboxylic acids, iminodiacetic acids, pyridylcarboxylic acids, aminophosphoric acids, carboxylic acids (including monocarboxylic acids, dicarboxylic acids, tricarboxylic acids, tetracarboxylic acids, and compounds containing substituents such as phosphono, hydroxy, oxo, ester, amido, alkoxy, mercapto, alkylthio, and phosphino groups), hydroxamic acids, polyacrylates, and polyphosphoric acids with alkali metals, guanidines, amidines, or quaternary ammonium salts.

The difficulty soluble metallic compound and the complex forming compound are preferably incorporated separately in the light-sensitive element and the dye fixing element.

The light-sensitive element and/or dye fixing element according to the present invention may comprise various development stopping agents in order to obtain a constant image regardless of any fluctuation in processing temperature and processing time at the development.

The term "development stopping agent" as used herein means a compound which rapidly neutralizes or reacts with a base after a proper development so that the base concentration in the layer is decreased to stop development or a compound which mutually acts on silver or silver salts to inhibit development. Specific examples of such a development stopping agent include acid precursors which release an acid upon heating, electrophilic compounds which undergo substitution reaction with a coexisting base upon heating, nitrogen-containing heterocyclic compounds, mercapto compounds, and precursors thereof (for example, compounds as described in JP-A-60-108837, JP-A-60-192939, JP-A-60-230133 and JP-a-60-230134.

Other useful examples of such a development stopping agent include compounds which release a mercapto compound upon heating, such as compounds as described, for example, in JP-A-61-67851, JP-A-61-147244, JP-A-61-124941, JP-A-61-185743, JP-A-61-182039, JP-A-61-185744, JP-A-61-184539, JP-A-61-188540 and JP-A-61-53632.

As binders for the light-sensitive element and/or the dye fixing element there may be used hydrophilic binders. Typical examples of such hydrophilic binders include transparent or translucent hydrophilic binders. Specific examples of such binders include natural substances, for example, proteins such as gelatin, and gelatin derivatives, polysaccharides such as cellulose derivatives, starch, gum arabic, and synthetic polymeric substance such as water-soluble polyvinyl compounds, e.g., polyvinyl pyrrolidone, acrylamide polymers. Other useful examples of suitable binders include a dispersed vinyl compound which is used in the form of a latex to improve the dimensional stability of a photographic material. These binders may be used singly or in combination.

In the present invention, the coating amount of the binder is 20 g or less, preferably 10 g or less, more preferably 7 g or less per 1 $m^2$.

The amount of the high boiling organic solvent dispersed with a hydrophobic compound such as a dye providing substance in the binder is ordinarily 1 ml or less, preferably 0.5 ml or less, more preferably 0.3 ml or less per 1 g of binder.

The constituent layer (for example, a photographic emulsion layer or a dye fixing layer) of the light-sensitive element and/or dye fixing element according to the present invention may contain an inorganic or organic hardener.

Specific examples of such hardener include those described in JP-A-61-147244, pages 94 to 95 and JP-A-59-157636, page 38. These hardeners may be used singly or in combination.

In order to accelerate the migration of a dye, a hydrophilic thermal solvent which is solid at normal temperature but melts at an elevated temperature may be incorporated in the light-sensitive element or the dye fixing element. Such a hydrophilic thermal solvent may be incorporated in either or both of the light-sensitive element and the dye fixing element. The layers in which the hydrophilic thermal solvent is incorporated include an emulsion layer, an intermediate layer, a protective layer, and a dye fixing layer. Particularly preferred among these layers are a dye fixing layer and/or layers adjacent thereto. Examples of the hydrophilic thermal solvent include ureas, pyridines, amides, sulfoamides, imides, alcohols, oxime, and other heterocyclic compounds. In order to accelerate the dye migration, a high boiling organic solvent may be incorporated in the light-sensitive element and/or the dye fixing element.

As the support for the light-sensitive element and/or the dye fixing element there can be used a material which can withstand the processing temperature. As such a support material there can be commonly used glass, paper, polymer film, metal, and analogous materials. Besides these materials, those described as support materials in JP-A-61-147244, pages 95 to 96 may be used.

The light-sensitive element and/or the dye fixing element may be in the form of an element having an electrically conductive heating element layer as a heating means for heat development or diffusion transfer of dye.

The transparent or translucent heating element to be used in this construction can be prepared as a resistive heating element by any suitable known method. Such a resistive heating element can be prepared from a thin film of a semiconductive inorganic material or from an organic thin film comprising finely divided particles of electrically conductive material dispersed in a binder. Examples of materials which can be employed in these methods include those described in JP-A-61-29835.

In the present invention, the coating of a heat developable light-sensitive layer, a protective layer, an intermediate layer, a subbing layer, a back layer, a dye fixing layer, or other layers can be accomplished by any suitable method, such as those described in U.S. Pat. No. 4,500,626, columns 55 to 56.

Examples of a light source which can be used for imagewise exposure to record an image on the light-sensitive element include light sources of radiation such as visible light. In general, there can be used a light-source for use in an ordinary color print process, for example a tungsten lamp, a mercury lamp, a halogen lamp such as an iodine lamp, a xenon lamp, a laser source, a CRT source, a light emitting diode (LED), and light sources as described in JP-A-61-147244, page 100 and U.S. Pat. No. 4,500,626, column 56.

In the image forming process comprising a heating step to which the present invention can be applied, the step of heat development and the step of dye transfer can be effected separately or at the same time. These steps may be successive in that the development is followed by the transfer.

For example, the following two image formation processes can be used.

(1) A light-sensitive element is imagewise exposed to light. After the light-sensitive element is heated, a dye fixing element is superposed on the light-sensitive element. These elements are heated, if desired, so that a mobile dye is transferred to the dye fixing element.

(2) A light-sensitive element is imagewise exposed to light. A dye fixing element is superposed on the light-sensitive element. These elements are heated.

These methods can be effected in the substantial absence of water or in the presence of a slight amount of water.

The heat development can be accomplished at a temperature of about 50° C. to about 250° C., preferably about 80° C. to about 180° C. When the heating is effected in the presence of a slight amount of water, the upper limit of the heating temperature is below the boiling point of water. If the transfer step is effected after the heat development step is finished, the heating temperature at the transfer step may be in the range of room temperature to the temperature at the heat development step, particularly in the range of 50° C. to a temperature of about 10° C. below the temperature at the heat development step.

In a preferred image formation process used in the present invention, heating is effected after imagewise exposure or at the same time with imagewise exposure in the presence of a slight amount of water and a base and/or base precursor, and a diffusible dye produced in the portions in correspondence or countercorrespondence to the development of silver image is moved to the dye fixing layer at the same time with the development. By this method, the production or release of a diffusible dye can progress extremely rapidly. This facilitates the migration of the diffusible dye to the dye fixing layer. Thus, color image of a high density can be provided in a short period of time.

The amount of water to be used in this system may be as small as at least 0.1 times, preferably 0.1 or more times, the total coating weight of the light-sensitive element and the dye fixing element to the weight of the solvent in a volume equivalent to the maximum swollen volume of the coated film (particularly, less than the value obtained by subtracting the weight of the coated film from the weight of the solvent in a volume equivalent to the maximum swollen volume of the coated film).

Since the film is unstable when swollen, it can show local stain under some conditions. In order to avoid such a problem, the amount of water to be used is preferably less than the volume equivalent to the maximum swollen volume of the coated film of light-sensitive element and dye fixing element. Specifically, it is preferably 1 to 50 g, particularly 2 to 35 g, more particularly 3 to 25 g per 1 $m^2$ of the total area of the light-sensitive element and dye fixing element.

The base and/or base precursor used in this system can be incorporated in the light-sensitive element or the dye fixing element. The base and/or base precursor may also be supplied by dissolving in water.

In the above described embodiment, the image forming system preferably contains as a base precursor a basic metal compound which is difficultly soluble in water and a compound which can undergo a complex forming reaction with metal ions constituting the metal compound and water as medium so that these two compounds react with each other upon heating to raise the pH value of the system. The term "image forming system" as used herein means a region in which an image forming reaction takes place. Specific examples of such a system include a layer which belongs to both the light-sensitive element and the dye fixing element. If two or more layers are present, any of these layers can be such a system.

The difficultly soluble metal compound and the complex forming compound at least need to be incorporated in separate layers in order to prevent themselves from reacting with each other before the development. For example, in a so-called monosheet material comprising a light-sensitive element and a dye fixing element provided on the same support, the above two compounds are preferably incorporated into separate layers with one or more layers interposed therebetween. A preferred form of such a construction is such that the difficultly soluble metal compound and the complex forming compound are incorporated in layers which are separately provided on two supports. For example, the difficultly soluble metal compound is incorporated into a light-sensitive element while the complex forming compound is incorporated in a dye fixing element provided on a support different from that for the light-sensitive element. The complex forming compound may be dissolved in the water which is to be present therewith. The difficultly soluble metal compound is preferably incorporated in the form of a fine dispersion prepared by the method as described in JP-A-56-174830 and 53-102733. The average size of the finely divided particles is preferably 50 $\mu m$ or less, particularly 5 $\mu m$ or less. The difficultly soluble metal compound may be incorporated in any of the light-sensitive layer, intermediate layer, and protective layer of the light-sensitive element. Alternatively, the difficultly soluble metal compound may be separately incorporated in two or more layers.

The amount of the difficultly soluble metal compound or the complex forming compound to be incorporated in the layer provided on the support depends on the type of the compounds, particle size of the difficultly soluble metal compound, and the reaction rate of complex formation. It is preferably in the range of 50% by weight or less, particularly from 0.01% to 40% by weight based on the weight of the coated layer. When the complex forming compound is dissolved in water before being supplied, the concentration thereof is preferably from 0.005 mol to 5 mol, particularly from 0.05 mol to 2 mol per liter. In the present invention, the molar proportion of the content of the complex forming compound in the reaction system to that of the difficultly soluble compound is preferably 1/100 to 100, particularly 1/10 to 20.

Examples of the process for imparting water to the light-sensitive layer or the dye fixing layer are described in JP-A-61-147244, page 101, line 9 to page 102, line 4.

Examples of heating means for use in the development step and/or transfer step include a heating plate, a flatiron, and a heating roller as described in JP-A-61-147244, page 102, line 14 to page 103, line 11. A layer of an electrically-conductive material such as graphite, carbon black, and metal may be provided superposed on the light-sensitive element and/or dye fixing element so that the light-sensitive element and/or dye fixing element can be directly heated by passing an electric current through the electrically conductive layer.

As the pressure conditions and the pressure application process for laminating the light-sensitive element with the dye fixing element there may be employed those described in JP-A-61-147244, pages 103 to 104.

The processing of the photographic element according to the present invention can be accomplished by any suitable heat developing apparatus. Preferred examples of such suitable heat developing apparatus include those described in JP-A-59-75247, JP-A-59-177547, JP-A-59-181353, JP-A-60-18951 and JU-A-62-25942.

The present invention will be explained in greater detail with reference to the following examples, but the present invention should not be construed as being limited thereto.

EXAMPLE 1

Process for the preparation of a Red-Light-Sensitive Emulsion (I) is described below.

To an aqueous gelatin solution (prepared by adding 20 g of gelatin, 1 g of potassium bromide and 0.5 g of OH(CH$_2$)$_2$S(CH$_2$)$_2$OH to 800 ml of water and maintained at 50° C.) which was being thoroughly stirred, were simultaneously added Solution (I), Solution (II) and Solution (III) each described below at the same flow rate over a period of 30 minutes. Thus, a dye adsorbed monodispersed silver bromide emulsion having an average grain size of 0.42 μm was prepared.

After being washed with water and desalted, 20 g of lime-processed ossein gelatin was added thereto and pH and pAg were adjusted to 6.4 and 8.2, respectively. Then, while maintaining the temperature at 60° C., 9 mg of sodium thiosulfate, 6 ml of a 0.01% aqueous solution of chloroauric acid and 190 mg of 4-hydroxy-6-methyl-1,3,3a,7-tetraazaindene were added and chemical sensitization was conducted for 45 minutes. The yield of the emulsion was 635 g.

| | Solution (I) | Solution (II) | Solution (III) |
|---|---|---|---|
| AgNO$_3$ | 100 g | — | — |
| KBr | — | 70 g | — |
| Dye (a) | — | — | 40 mg |
| Dye (b) | — | — | 80 mg |
| | Water to make 450 ml | Water to make 400 ml | Methanol to make 60 ml |

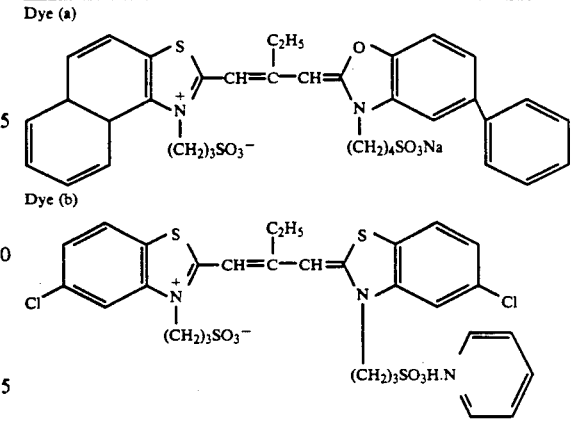

Dye (a)

Dye (b)

Process for the preparation of a Green-Light-Sensitive Emulsion (II) is described below.

To an aqueous gelatin solution (prepared by adding 20 g of gelatin, 0.30 g of potassium bromide, 6 g of sodium chloride and 0.015 g of Reagent A shown below to 730 ml of water and maintained at 60.0° C.) which was being thoroughly stirred, were simultaneously added Solution (I) and Solution (II) each described below at the same flow rate over a period of 60 minutes. After the completion of the addition of Solution (I), Solution (III) of a Sensitizing Dye C described below in methanol was added thereto. Thus, a dye adsorbed monodispersed cubic silver chlorobromide emulsion having an average grain size of 0.45 μm was prepared.

After being washed with water and desalted, 20 g of gelatin was added thereto and pH and pAg were adjusted to 6.4 and 7.8, respectively. Then, the emulsion was subjected to chemical sensitization at 60.0° C. using 1.6 mg of triethylthiourea and 100 mg of 4-hydroxy-6-methyl-1,3,3a,7-tetraazaindene for a ripening time of 55 minutes. The yield of the emulsion was 635 g.

Reagent A

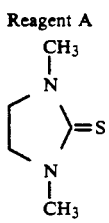

Sensitizing Dye C

-continued

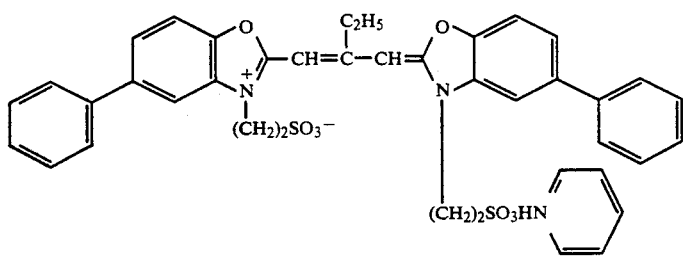

|  | Solution (I) | Solution (II) | Solution (III) |
|---|---|---|---|
| AgNO₃ | 100.0 g | — | — |
| KBr | — | 56.0 g | — |
| NaCl | — | 7.2 g | — |
| Dye C | — | — | 0.23 mg |
|  | Water to make 400 ml | Water to make 400 ml | Methanol to make 77 ml |

Process for the preparation of a Blue-Light-Sensitive Emulsion (III) is described below.

To an aqueous gelatin solution (prepared by adding 20 g of gelatin, 3 g of potassium bromide and 0.3 g of HO(CH₂)₂S(CH₂)₂S(CH₂)₂OH to 800 ml of water and maintained at 60° C.) which was being thoroughly stirred, were simultaneously added Solution (I) and Solution (II) each described below over a period of 30 minutes, and then were simultaneously added Solution (III) and Solution (IV) each described below over a period of 20 minutes. After the completion of the addition, 30 ml of a 1% aqueous solution of potassium iodide and then the dye solution shown below were added thereto.

After being washed with water and desalted, 20 g of lime-processed ossein gelatin was added thereto and pH and pAg were adjusted to 6.2 and 8.5, respectively. Then, the emulsion was subjected to optimum chemical sensitization using sodium thiosulfate, chloroauric acid and 4-hydroxy-6-methyl-1,3,3a,7-tetraazaindene. Thus, 600 g of a monodispersed octahedral silver iodobromide emulsion having an average grain size of 0.50 μm was obtained.

|  | Solution (I) | Solution (II) | Solution (III) | Solution (IV) |
|---|---|---|---|---|
| AgNO₃ | 30 g | — | 70 g | — |
| KBr | — | 20 g | — | 49 g |
| KI | — | 1.8 g | — | — |
|  | Water to make 180 ml | Water to make 180 ml | Water to make 350 ml | Water to make 350 ml |

Dye Solution

A solution containing 0.14 g of the dye described below dissolved in 70 ml of methanol.

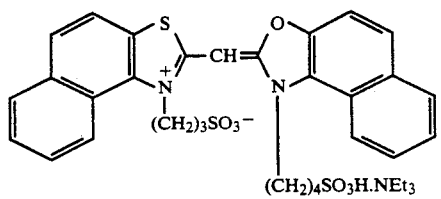

Process for the preparation of a gelatin dispersion of dye providing substance is described below.

A mixture of 20 g of yellow dye providing substance (a), 13.6 g of electron donor (ED-1), 10 g of tricyclohexyl phosphate and 57 ml of ethyl acetate were heated at about 60° C. to prepare a uniform solution which was designated Solution X. The resulting solution was mixed with stirring with 110 g of a 10% aqueous solution of lime-processed gelatin, 65 ml of water and 1.7 g of sodium dodecylbenzenesulfonate, and the mixture was then dispersed by means of a homogenizer at 10,000 rpm for 10 minutes. The dispersion thus obtained was designated a dispersion of yellow dye providing substance.

In the same manner for the dispersion of yellow dye providing substance as described above, dispersions of magenta and cyan dye providing substances were prepared except for changing the composition of Solution X to those described in Table 1 below, respectively.

TABLE 1

| Dye Providing Substance | Composition of Solution X ||||| 
|---|---|---|---|---|---|
|  | b | c | d | e | f |
| Hue | magenta | cyan | cyan | cyan | cyan |
| Amount of Dye Providing Substance (g) | 25.8 | 23.7 | 25.4 | 23 | 23 |
| Amount of Electron Donor (ED-1) (g) | 13.2 | 12.6 | 12.6 | 12.6 | 12.6 |
| Amount of Tricyclohexyl Phosphate (g) | 12.9 | 11.9 | 12.7 | 11.5 | 11.5 |
| Amount of Ethyl Acetate (ml) | 57 | 125 | 57 | 118 | 135 |

Yellow Dye Providing Substance (a):

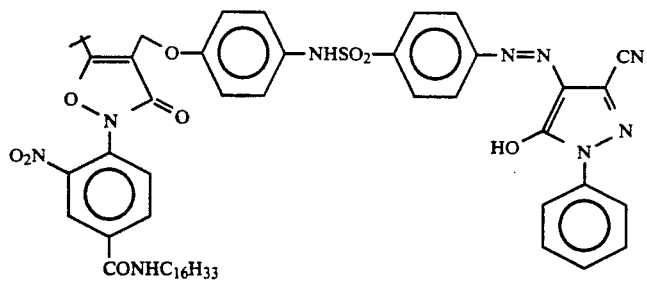
Magenta Dye Providing Substance (b):
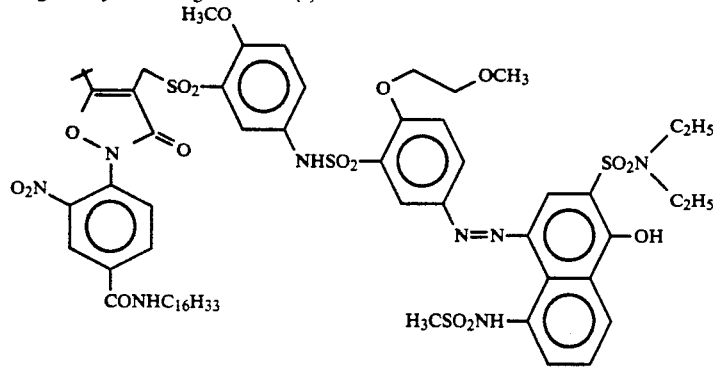
Cyan Dye Providing Substance (c):
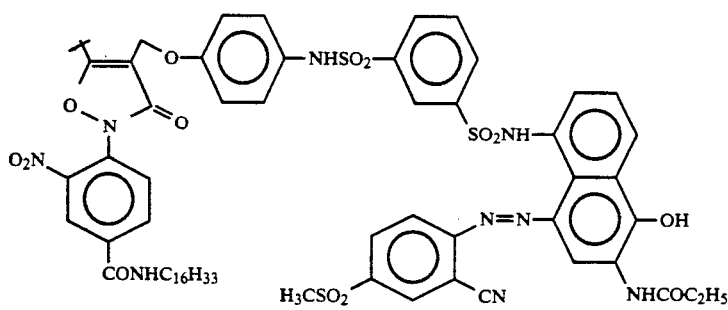
Cyan Dye Providing Substance (d) according to the present invention:
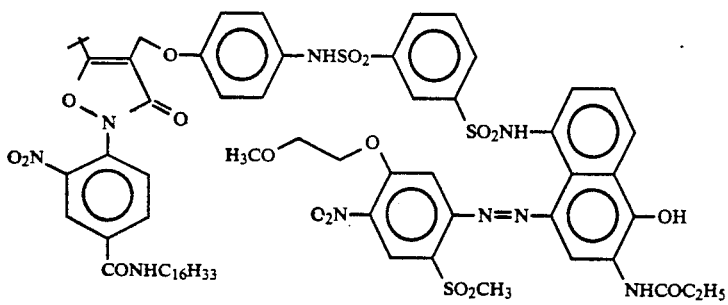
Cyan Dye Providing Substance (e):
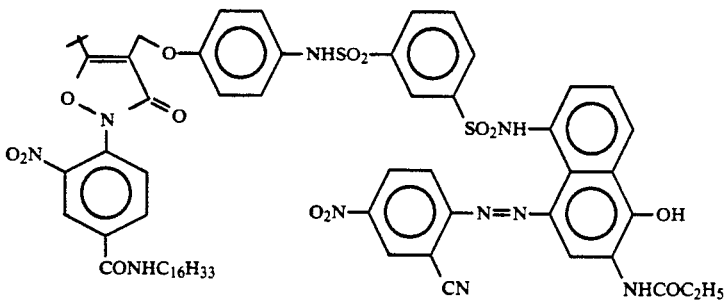

Cyan Dye Providing Substance (f):

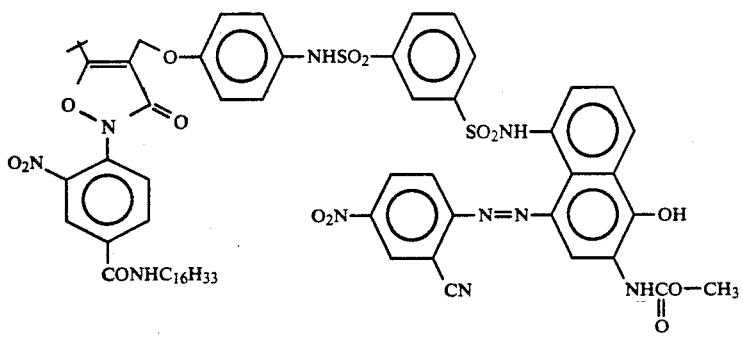

Using the dispersion of cyan dye providing substance (c) and red-light-sensitive emulsion (I) as described above, Light-Sensitive Material 101 composed of two layers shown in Table 2 below was prepared.

TABLE 2

Second Layer: Protective Layer
Gelatin (0.79 g/m²),
Matting agent (silica) (0.01 g/m²),
Zn(OH)₂ (0.46 g/m²),
Surface active agent (1) (0.05 g/m²),
Surface active agent (2) (0.10 g/m²),
Water-soluble polymer (1) (0.03 g/m²),
Hardening agent (1) (0.009 g/m²)
First Layer: Red-Light-Sensitive Layer
Emulsion (I) (0.21 g/m² as silver),
Gelatin (0.30 g/m²),
Antifogging agent (1) (6.4 × 10⁻⁴ g/m²),
Cyan dye providing substance (c) (0.30 g/m²),
Organic solvent having a high boiling point (1) (0.15 g/m²),
Electron donor (ED-1) (0.16 g/m²),
Surface active agent (3) (0.03 g/m²),
Electron transfer agent (X-2) (0.04 g/m²),
Hardening agent (1) (0.003 g/m²),
Water-soluble polymer (1) (0.01 g/m²)
Support:
Polyethylene terephthalate (thickness: 100 μm)
Back Layer:
Carbon black (0.44 g/m²),
Polyester (0.30 g/m²),
Polyvinyl chloride (0.30 g/m²)

The additives shown in Table 2 above other than those described hereinbefore are illustrated below.

Water-soluble polymer (1)

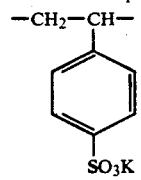

Surface active agent (1)
Aerosol OT

Surface active agent (2)

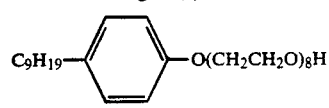

Surface active agent (3)

$C_{12}H_{25}$—⟨⟩—$SO_3Na$

Hardening agent (1)
1,2-Bis(vinylsulfonylacetamido)ethane

Organic solvent having a high boiling point (1)
Tricyclohexyl phosphate

Antifogging agent (1)

Electron donor (ED-1)

Electron transfer agent (X-2)

Process for the preparation of a dye fixing material is described below.

Dye Fixing Material R-1 was prepared by coating each layer having the composition shown in Table 3 below on a polyethylene laminated paper support.

TABLE 3

Third Layer:
Gelatin (0.05 g/m²),
Matting agent (silica) (0.02 g/m²),
Silicone oil (1) (0.04 g/m²),
Surface active agent (2) (0.001 g/m²),
Surface active agent (3) (0.02 g/m²),
Surface active agent (4) (0.10 g/m²),
Guanidium picrate (0.45 g/m²),
Polymer (5) (0.24 g/m²)
Second Layer:

TABLE 3-continued

Mordant (6) (2.35 g/m²),
Polymer (7) (0.60 g/m²),
Gelatin (1.40 g/m²),
Polymer (5) (0.21 g/m²),
Organic solvent having a high boiling point (8) (1.40 g/m²),
Guanidium picrate (0.60 g/m²),
Surface active agent (2) (0.02 g/m²)
First Layer:
Gelatin (0.45 g/m²),
Surface active agent (4) (0.01 g/m²),
Polymer (5) (0.04 g/m²),
Hardening agent (9) (0.30 g/m²)
Support:
Polyethylene laminated paper (thickness: 170 μm)
First Back Layer:
Gelatin (3.25 g/m²),
Hardening agent (9) (0.25 g/m²)
Second Back Layer:
Gelatin (0.44 g/m²),
Silicone oil (1) (0.08 g/m²),
Surface active agent (5) (0.002 g/m²),
Matting agent (10) (0.09 g/m²)

Matting agent (10)
Benzoguanamine resin (average particle size: 15 μm)

The additives shown in Table 3 above are illustrated below.

Silicone oil (1)

$$CH_3-Si(CH_3)_2-O\!-\!(Si(CH_3)_2-O)_{20}\!-\!(Si(CH_3)(-(CH_2)_3COOH)-O)_4\!-\!Si(CH_3)_3$$

Surface active agent (2)
Aerosol OT

Surface active agent (3)
$C_8F_{17}SO_2NCH_2COOK$
        |
        $C_3H_7$

Surface active agent (4)

$$C_{11}H_{23}CONHCH_2CH_2CH_2N^{\oplus}(CH_3)_2CH_2COO^{\ominus}$$

Surface active agent (5)
         $C_3H_7$
         |
$C_8F_{17}SO_2N(CH_2CH_2O)_4\!-\!(CH_2)_4SO_4Na$ Polymer (5)
Copolymer of vinyl alcohol and sodium acrylate (75:25 in molar ratio)

Polymer (7)
Dextran (average molecular weight: 70,000)

Mordant (6)

$$-(CH_2-CH)_{50}-(CH_2-CH)_{30}-(CH_2-CH)_{10}-$$

with pendant groups: pyridine, 2-pyrrolidone (N-H), and phenyl-SO₂K

Organic solvent having a high boiling point (8)
Leophos 95 (manufactured by Ajinomoto Co., Ltd.)

Hardening agent (9)

$$(CH_2)_4(-O-CH_2-CH(-O-)CH_2)_2$$

Light-Sensitive Materials 102 to 104 were prepared in the same manner as described for Light-Sensitive Material 101, except for using the dispersions each containing the equimolar amount of cyan dye providing substance (d), (e) or (f) in place of the dispersion containing cyan dye providing substance (c), respectively.

Light-Sensitive Materials 101 to 104 thus-prepared were each exposed to light through a grey filter, the density of which continuously changes, for 1 second at 2,000 lux using a tungsten lamp. On the emulsion side surface of the exposed light-sensitive material was supplied water at a rate of 6 ml/m² by a wire bar and then it was superimposed on the dye fixing material in such a manner that their coated layers were in contact with each other. These materials were heated for 15 seconds using a heat roller which had been so adjusted that the temperature of the layers containing absorbed water became 85° C.

Then, the dye fixing material was peeled apart from the light-sensitive material, whereupon a cyan image, the density of which continuously changed, was obtained in the dye fixing material corresponding to the grey filter.

The maximum density ($D_{max}$) and the minimum density ($D_{min}$) of the cyan image, and the maximum absorption wavelength (nm) of the $D_{max}$ portion were measured.

The results thus-obtained are shown in Table 4 below.

TABLE 4

| Light-Sensitive Material | Cyan Dye Providing substance | $D_{max}$ | $D_{min}$ | $\lambda_{max}$ |
|---|---|---|---|---|
| 101 | c (Comparison) | 1.80 | 0.14 | 622 |
| 102 | d (Present Invention) | 2.05 | 0.11 | 652 |
| 103 | e (Comparison) | 1.45 | 0.12 | 662 |
| 104 | f (Comparison) | 1.43 | 0.12 | 662 |

Density was measured by a Macbeth densitometer.

From the results shown in Table 4 above, it is apparent that the cyan dye providing substance (d) according to the present invention exhibits a spectral absorption in a longer wavelength range in comparison with the cyan dye providing substance (c) for comparison and has the $\lambda_{max}$ suitable for use in color light-sensitive materials. Further, from the values of $D_{max}$ and $D_{min}$, it is understood that the cyan dye providing substance (d) apparently provides good discrimination in comparison with the cyan dye providing substance (c), (e) and (f).

Moreover, since the cyan dye providing substance (d) has a good solubility, it requires a small amount of ethyl acetate necessary for the preparation of Solution X containing the dye providing substance as compared with the cyan dye providing substances (c), (e) and (f).

EXAMPLE 2

Multilayer Color Light-Sensitive Material 201 described in Table 5 below was prepared using the components as illustrated in Example 1.

TABLE 5

| Sixth Layer: Protective Layer | |
|---|---|
| Gelatin | (0.92 g/m²), |

TABLE 5-continued

| | |
|---|---|
| Zn(OH)$_2$ | (0.61 g/m$^2$), |
| Matting agent (silica) | (0.03 g/m$^2$), |
| Water-soluble polymer (1) | (0.02 g/m$^2$), |
| Surface active agent (1) | (0.06 g/m$^2$), |
| Surface active agent (4) | (0.13 g/m$^2$), |
| Hardening agent (1) | (0.01 g/m$^2$) |
| Fifth Layer: Blue-Light-Sensitive Layer | |
| Emulsion (III) | (0.35 g/m$^2$ as silver), |
| Gelatin | (0.48 g/m$^2$), |
| Antifogging agent (2) | (5.00 × 10$^{-4}$ g/m$^2$), |
| Yellow dye providing substance (a) | (0.41 g/m$^2$), |
| Organic solvent having a high boiling point (1) | (0.21 g/m$^2$), |
| Electron donor (ED-1) | (0.28 g/m$^2$), |
| Surface active agent (3) | (0.05 g/m$^2$), |
| Electron transfer agent (X-2) | (0.04 g/m$^2$), |
| Hardening agent (1) | (0.004 g/m$^2$), |
| Water-soluble polymer (1) | (0.01 g/m$^2$) |
| Fourth Layer: Intermediate layer | |
| Gelatin | (0.70 g/m$^2$), |
| Surface active agent (1) | (0.02 g/m$^2$), |
| Surface active agent (3) | (0.01 g/m$^2$), |
| Surface active agent (2) | (0.06 g/m$^2$), |
| Water-soluble polymer (1) | (0.02 g/m$^2$), |
| Reducing agent (1) | (0.13 g/m$^2$), |
| Organic solvent having a high boiling point (1) | (0.05), |
| Hardening agent (1) | (0.008 g/m$^2$) |
| Third Layer: Green-Light-Sensitive Layer | |
| Emulsion (II) | (0.21 g/m$^2$ as silver), |
| Gelatin | (0.30 g/m$^2$), |
| Antifogging agent (1) | (6.4 × 10$^{-4}$ g/m$^2$), |
| Magenta dye providing substance (b) | (0.32 g/m$^2$), |
| Organic solvent having a high boiling point (1) | (0.16 g/m$^2$), |
| Electron donor (ED-1) | (0.12 g/m$^2$), |
| Surface active agent (3) | (0.03 g/m$^2$), |
| Electron transfer agent (X-2) | (0.04 g/m$^2$), |
| Hardening agent (1) | (0.003 g/m$^2$), |
| Water-soluble polymer (1) | (0.01 g/m$^2$) |
| Second Layer: Intermediate layer | |
| Gelatin | (0.79 g/m$^2$), |
| Matting agent (silica) | (0.008 g/m$^2$), |
| Zn(OH)$_2$ | (0.46 g/m$^2$), |
| Surface active agent (1) | (0.05 g/m$^2$), |
| Surface active agent (2) | (0.10 g/m$^2$), |
| Water-soluble polymer (1) | (0.03 g/m$^2$), |
| Reducing agent (1) | (0.13 g/m$^2$), |
| Organic solvent having a high boiling point | (0.05 g/m$^2$), |
| Hardening agent (1) | (0.009 g/m$^2$) |
| First Layer: Red-Light-Sensitive Layer | |
| Emulsion (I) | (0.21 g/m$^2$ as silver), |
| Gelatin | (0.30 g/m$^2$), |
| Antifogging agent (1) | (6.4 × 10$^{-4}$ g/m$^2$), |
| Cyan dye providing substance (c) | (0.30 g/m$^2$), |
| Organic solvent having a high boiling point (1) | (0.15 g/m$^2$), |
| Electron donor (ED-1) | (0.16 g/m$^2$), |
| Surface active agent (3) | (0.03 g/m$^2$), |
| Electron transfer agent (X-2) | (0.04 g/m$^2$), |
| Hardening agent (1) | (0.003 g/m$^2$), |
| Water-soluble polymer (1) | (0.01 g/m$^2$) |
| Support: | |
| Polyethylene terephthalate | (thickness: 100 μm) |
| Back Layer: | |
| Carbon black | (0.44 g/m$^2$), |
| Polyester | (0.30 g/m$^2$), |
| Polyvinyl chloride | (0.30 g/m$^2$) |

The additives shown in Table 5 above other than those described hereinbefore are illustrated below.

Surface active agent (4)

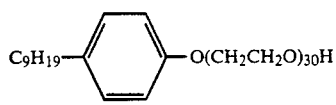

Antifogging agent (2)

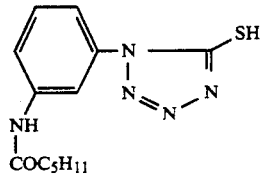

Reducing agent (1)

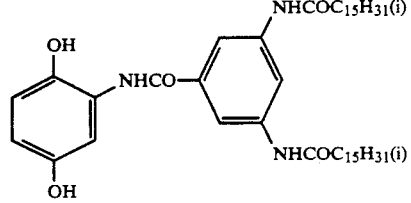

Process for the preparation of a dye fixing material is described below.

Dye Fixing Material R-2 was prepared by coating each layer having the composition shown in Table 6 below on a polyethylene laminated paper support.

TABLE 6

| | |
|---|---|
| Third Layer: | |
| Gelatin | (0.05 g/m$^2$), |
| Matting agent (silica) | (0.02 g/m$^2$), |
| Silicone oil (1) | (0.04 g/m$^2$), |
| Surface active agent (2) | (0.001 g/m$^2$), |
| Surface active agent (3) | (0.02 g/m$^2$), |
| Surface active agent (4) | (0.10 g/m$^2$), |
| Guanidium picrate | (0.45 g/m$^2$), |
| Polymer (5) | (0.24 g/m$^2$) |
| Second Layer: | |
| Mordant (6) | (2.35 g/m$^2$), |
| Polymer (7) | (0.60 g/m$^2$), |
| Gelatin | (1.40 g/m$^2$), |
| Polymer (5) | (0.21 g/m$^2$), |
| Organic solvent having a high boiling point (8) | (1.40 g/m$^2$), |
| Guanidium picrate | (2.20 g/m$^2$), |
| Surface active agent (2) | (0.02 g/m$^2$) |
| First Layer: | |
| Gelatin | (0.45 g/m$^2$), |
| Surface active agent (4) | (0.01 g/m$^2$), |
| Polymer (5) | (0.04 g/m$^2$), |
| Hardening agent (9) | (0.30 g/m$^2$) |
| Support: | |
| Polyethylene laminated paper | (thickness: 170 μm) |
| First Back Layer: | |
| Gelatin | (3.25 g/m$^2$), |
| Hardening agent (9) | (0.25 g/m$^2$) |
| Second Back Layer: | |
| Gelatin | (0.44 g/m$^2$), |
| Silicone oil (1) | (0.08 g/m$^2$), |
| Surface active agent (5) | (0.002 g/m$^2$), |
| Matting agent (10) | (0.09 g/m$^2$) |

The additives shown in Table 6 above are same as these described for Dye Fixing Material R-1.

Color Light-Sensitive Materials 202 to 204 were prepared in the same manner as described for color Light-Sensitive Material 201, except for using the dispersions each containing an equimolar amount of cyan dye providing substance (d), (e) or (f) in place of the dispersion containing the cyan dye providing substance (c), respectively.

The multilayer color light-sensitive material as described above was exposed to light through a color separation filter of B, G and R and a grey filter, the density of each of which continuously changes, for 1/10 second at 5,000 lux using a tungsten lamp. On the emulsion side surface of the exposed light-sensitive material transported at a line speed of 20 mm/sec. was supplied water at a rate of 15 ml/m$^2$ by a wire bar and then immediately it was superimposed on the dye fixing material in such a manner that their coated layers were in contact with each other. These materials were heated for 15 seconds using a heat roller which had been so adjusted that the temperature of the layers containing absorbed water became 85° C.

Then, the dye fixing material was peeled apart from the light-sensitive material, whereupon clear blue, green, red and grey images without unevenness were obtained in the dye fixing material corresponding to the color separation filter of B, G and R and the grey filter, respectively.

Further, Light-Sensitive Materials 201 to 204 were preserved under the conditions of 40° C. and 70% RH for one week and thereafter exposed to light and subjected to development processing in the same manner as described above. With the samples before the preservation (referred to as Sample A) and the samples after the preservation (referred to as Sample B), the maximum density ($D_{max}$) and the minimum density ($D_{min}$) of Cyan color at the grey area were measured.

The results are shown in Table 7 below.

TABLE 7

| Light-Sensitive Material | Cyan Dye Providing substance | Sample A $D_{max}$ | Sample A $D_{min}$ | Sample B $D_{max}$ | Sample B $D_{min}$ |
|---|---|---|---|---|---|
| 201 | c (Comparison) | 1.75 | 0.13 | 1.75 | 0.17 |
| 202 | d (Present Invention) | 2.10 | 0.10 | 2.08 | 0.12 |
| 203 | e (Comparison) | 1.42 | 0.11 | 1.50 | 0.15 |
| 204 | f (Comparison) | 1.40 | 0.11 | 1.45 | 0.15 |

From the results shown in Table 7 above, it can be seen that the cyan dye providing substance (d) according to the present invention provides good discrimination both just after the production of the light-sensitive material and after the preservation thereof in comparison with the cyan dye providing substances (c), (e) and (f) for comparison.

EXAMPLE 3

Multilayer Color Light-Sensitive Material 301 described in Table 8 below was prepared using the same emulsions, dye providing substances, electron donor, and electron transfer agent as employed in Examples 1 and 2. The additives used were the same as those described in Light-Sensitive materials 101 and 201, unless otherwise indicated.

An organic silver salt emulsion was prepared in the manner described below.

20 g of gelatin and 5.9 g of 4-acetylaminophenyl propiolic acid were dissolved in 1,000 ml of a 0.1% aqueous sodium hydroxide solution and 200 ml of ethanol. The solution thus prepared was then stirred while keeping the temperature thereof at 40° C. A solution of 4.5 g of silver nitrate dissolved in 200 ml of water was added to the solution for 5 minutes. The excess salts were then removed by a flocculation method. The pH of the dispersion was adjusted to 6.3 to obtain 300 g of a dispersion of the organic silver salt.

Further, a Precursor of antifogging agent (1) described below, was added in an amount of 0.2 times (in moles) the dye providing substance, and dispersed together with the dye providing substance and the electron doner in the same manner as described in Example 1.

TABLE 8

| Sixth Layer: Protective Layer | |
|---|---|
| Gelatin | (0.91 g/m$^2$), |
| matting agent (silica) | (0.03 g/m$^2$), |
| Surface active agent (1) | (0.06 g/m$^2$), |
| Surface active agent (4) | (0.13 g/m$^2$), |
| Hardening agent (1) | (0.01 g/m$^2$), |
| Base precursor (1) | (0.30 g/m$^2$) |
| Fifth Layer: Blue-Light-Sensitive Layer | |
| Emulsion (III) | (0.30 g/m$^2$ as silver), |
| Organic silver salt emulsion | (0.25 g/m$^2$ as silver), |
| Gelatin | (1.00 g/m$^2$), |
| Precursor of antifogging agent (1) | (0.07 g/m$^2$), |
| Yellow dye providing substance (a) | (0.50 g/m$^2$), |
| Organic solvent having a high boiling point (1) | (0.75 g/m$^2$), |
| Electron donor (ED-1) | (0.35 g/m$^2$), |
| Surface active agent (3) | (0.05 g/m$^2$), |
| Electron transfer agent (X-2) | (0.04 g/m$^2$), |
| Thermal solvent (1) | (0.20 g/m$^2$), |
| Hardening agent (1) | (0.01 g/m$^2$), |
| Base precursor (1) | (0.27 g/m$^2$), |
| Water-soluble polymer (1) | (0.02 g/m$^2$) |
| Fourth Layer: Intermediate Layer | |
| Gelatin | (0.75 g/m$^2$), |
| Reducing agent (2) | (0.24 g/m$^2$), |
| Surface active agent (1) | (0.02 g/m$^2$), |
| Surface active agent (2) | (0.07 g/m$^2$), |
| Water-soluble polymer (1) | (0.02 g/m$^2$), |
| Hardening agent (1) | (0.01 g/m$^2$), |
| Base precursor (1) | (0.25 g/m$^2$) |
| Third Layer: Green-Light-Sensitive Layer | |
| Emulsion (II) | (0.20 g/m$^2$ as silver), |
| Organic silver salt emulsion | (0.20 g/m$^2$ as silver), |
| Gelatin | (0.85 g/m$^2$), |
| Precursor of antifogging agent (1) | (0.04 g/m$^2$), |
| Magenta dye providing substance (b) | (0.37 g/m$^2$), |
| Organic solvent having a high boiling point (1) | (0.55 g/m$^2$), |
| Electron donor (ED-1) | (0.20 g/m$^2$), |
| Surface active agent (3) | (0.04 g/m$^2$), |
| Electron transfer agent (X-2) | (0.04 g/m$^2$), |
| Thermal solvent (1) | (0.16 g/m$^2$), |
| Hardening agent (1) | (0.01 g/m$^2$), |
| Base precursor (1) | (0.25 g/m$^2$), |
| Water-soluble polymer (1) | (0.02 g/m$^2$) |
| Second Layer: Intermediate Layer | |
| Gelatin | (0.80 g/m$^2$), |
| Reducing agent (2) | (0.24 g/m$^2$), |
| Surface active agent (1) | (0.06 g/m$^2$), |
| Surface active agent (2) | (0.10 g/m$^2$), |
| Water-soluble polymer (1) | (0.03 g/m$^2$), |
| Base precursor (1) | (0.25 g/m$^2$), |
| Hardening agent (1) | (0.01 g/m$^2$) |
| First Layer: Red-Light-Sensitive Layer | |
| Emulsion (I) | (0.20 g/m$^2$ as silver), |
| Organic silver salt emulsion | (0.20 g/m$^2$ as silver), |
| Gelatin | (0.85 g/m$^2$), |
| Precursor of antifogging agent (1) | (0.04 g/m$^2$), |
| Thermal solvent (1) | (0.16 g/m$^2$), |
| Base precursor (1) | (0.25 g/m$^2$), |
| Cyan dye providing substance (c) | (0.40 g/m$^2$), |
| Organic solvent having a high boiling point (1) | (0.60 g/m$^2$), |
| Electron donor (ED-1) | (0.20 g/m$^2$), |
| Surface active agent (3) | (0.04 g/m$^2$), |
| Electron transfer agent (X-2) | (0.04 g/m$^2$), |
| Hardening agent (1) | (0.01 g/m$^2$), |
| Water-soluble polymer (1) | (0.02 g/m$^2$) |
| Support: | |
| Polyethylene terephthalate | (thickness: 100 μm) |

TABLE 8-continued

| Back Layer: | |
|---|---|
| Carbon black | (0.44 g/m²), |
| Polyester | (0.30 g/m²), |
| Polyvinyl chloride | (0.30 g/m²) |

The additive shown in Table 8 above other than those described hereinbefore are illustrated below.

Precursor of antifogging agent (1)

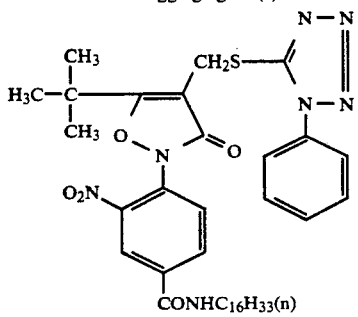

Thermal solvent (1)
Benzenesulfonamide
Base precursor (1)
Guanidium 4-chlorophenylsulfonylacetate
Reducing agent (2)

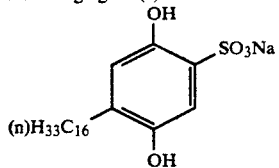

Process for the preparation of Dye Fixing Material R-3 is described hereinafter.

10 g of poly(methyl acrylate-co-N,N,N-trimethyl-N-vinylbenzylammonium chloride) (ratio of methyl acrylate to vinylbenzylammonium chloride: 1/1) was dissolved in 200 ml of water. The solution was uniformly mixed with 100 g of a 10% aqueous solution of lime-processed gelatin and a hardening agent was added thereto. The admixture was then uniformly coated on a paper support laminated with polyethylene comprising titanium dioxide dispersed therein to a wet layer thickness of 90 μm and dried, whereby Dye Fixing Material R-3 was obtained.

Color Light-Sensitive Materials 302 to 304 were prepared in the same manner as described for Color Light-Sensitive Material 301, except for using the dispersions each containing an equimolar amount of cyan dye providing substance (d), (e) or (f) in place of the dispersion containing the cyan dye providing substance (c), respectively.

The color light-sensitive material was exposed to light in the same manner as described in Example 2 and then uniformly heated for 30 seconds on a heat block which had been heated at 140° C.

On the coated layer side surface of Dye Fixing Material R-3 was supplied water in an amount of 20 ml per m² and then the light-sensitive material after heat treatment was superimposed on the fixing material in such a manner that their coated layers were in contact with each other. These materials were passed through a laminater heated at 80° C. at a line speed of 12 mm/sec.

Then, the dye fixing material was peeled apart from the light-sensitive material and a positive image having a good S/N ratio was obtained in the dye fixing material.

The maximum density ($D_{max}$) and the minimum density ($D_{min}$) of cyan color at the grey area were measured.

The results thus-obtained are shown in Table 9 below.

TABLE 9

| Light-Sensitive Material | Cyan Dye Providing substance | $D_{max}$ | $D_{min}$ |
|---|---|---|---|
| 301 | c (Comparison) | 1.70 | 0.15 |
| 302 | d (Present Invention) | 1.95 | 0.12 |
| 303 | e (Comparison) | 1.40 | 0.13 |
| 304 | f (Comparison) | 1.40 | 0.13 |

From the results shown in Table 9 above, it can also be seen in this example that the cyan dye providing substance (d) according to the present invention provides good discrimination as compared with the cyan dye providing substances (c), (e) and (f) for comparison.

While the invention has been described in detail and with reference to specific embodiments thereof, it will be apparent to one skilled in the art that various changes and modifications can be made therein without departing from the spirit and scope thereof.

What is claimed is:

1. A silver halide color photographic material comprising a support having thereon at least one silver halide emulsion layer, wherein the silver halide color photographic material contains an image forming compound represented by the following general formula (I):

$$(Dye-X)_1-y \qquad (I)$$

wherein Dye represents a cyan dye group represented by the general formula (II) described below or a precursor thereof; X represents a chemical bond or a linking group; Y represents a group having a property of releasing Dye in correspondence or counter-correspondence to development of a light-sensitive silver salt having a latent image distributed imagewise and making a difference in diffusibility between the dye thus-released and the compound represented by $(Dye-X)_1-Y$; Dye and X are connected with each other by C or E in the general formula (II); and q represents an integer of 1 or 2, and when q is 2, the two groups (Dye—X) may be the same or different:

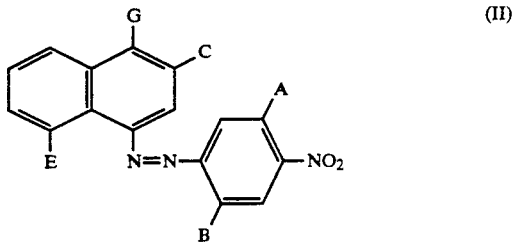

wherein A represents a halogen atom, —OR¹ or —SR¹ (wherein R¹ represents an alkyl group, an aryl group or a heterocyclic group); B represents an electron withdrawing group having a Hammett's op value of not less than 0.3; C represents a chemical bond, a hydrogen atom, an alkyl group, a cycloalkyl group, an aryl group, a halogen atom, —OR⁴, —CONR⁴R⁵, —SO₂NR⁴R⁵, —N(R³)—COR₄ or —N(R³)—SO₂R₄ (wherein R³, R⁴ and R⁵ each represents a hydrogen atom or a group selected from those defined for $R^1$, or $R^4$ and $R^5$ may combine with each other to form a 5-membered or 6-membered ring); E represents a chemical bond, a hydrogen atom, an alkyl group, a halogen atom, $-OR^4$, $-CONR^4R^5$, $-SO_2NR^4R^5$, $-N(R^5)-COR^4$ or $-N(R^5)-SO_2 R^4$ (wherein $R^4$ and $R^5$ have the same meaning as defined above); and G represents a hydroxy group or a salt thereof, or a group selected from those represented by the formula (T), (U) or (V):

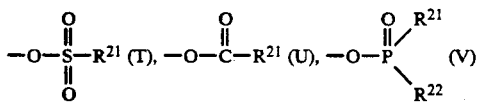

wherein $R^{21}$ and $R^{22}$, which may be the same or different, each represents an alkyl group, a cycloalkyl group, an alkenyl group, an aralkyl group, an aryl group, a heterocyclic group, an alkylthio group, an arylthio group, an alkoxy group, an aryloxy group or an amino group, or $R^{21}$ and $R^{22}$ may combine with each other to form a 5-membered or 6-membered ring.

2. A silver halide color photographic material as claimed in claim 1, wherein the electron withdrawing group represented by B is a cyano group, $-SO_2R^1$, $-SO_2NR^4R^5$, a chlorine atom, $-COR^1$, $-CONR^4R^5$ or a nitro group, wherein $R^1$ represents an alkyl group, an aryl group or a heterocyclic group; and $R^4$ and $R^5$, which may be the same or different, each represents a hydrogen atom or a group selected from those defined for $R^1$, or $R^4$ and $R^5$ may combine with each other to form a morpholine ring or a piperadine ring.

3. A silver halide color photographic material as claimed in claim 2, wherein B is cyano group or an $-SO_2R^1$ group.

4. A silver halide color photographic material as claimed in claim 1, wherein Y is a group represented by the following general formula (YXIV):

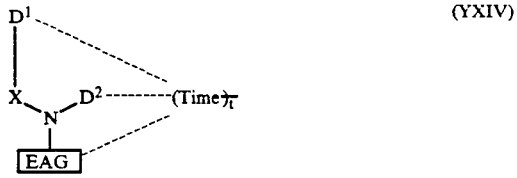

wherein EAG represents a group which receives electrons from a reducing material; X represents a nitrogen atom, an oxygen atom or a sulfur; the single bond between N and X undergoes cleavage after EAG receives electrons; $D^1$ and $D^2$ each represents a chemical bond or a substituent other than a hydrogen atom, when $D^1$ or $D^2$ is bonded to $-$Time$-_t$, $D^1$ or $D^2$ is a chemical bond, or $D^1$ and $D^2$ may be connected with each other to form a ring; Time represents a group which releases a dye upon a reaction triggered by the cleavage of the nitrogen—X single bond; t represents an integer of 0 or 1; the solid line indicates a chemical bond; and at least one of the broken lines is bonded to the respective group.

5. A silver halide color photographic material as claimed in claim 1, wherein the amount of the dye image forming compound is from 0.01 mol to 4 mol per mol of silver.

* * * * *